(12) United States Patent
Swanson et al.

(10) Patent No.: US 8,220,167 B2
(45) Date of Patent: Jul. 17, 2012

(54) METHOD OF PREPARING A PANEL FOR FITTING TO A STRUCTURE

(75) Inventors: David W. Swanson, Fallbrook, CA (US); William Robert Swanson, Fallbrook, CA (US)

(73) Assignee: Delta II, I.P. (Trust), Stockton, CA (US)

( * ) Notice: Subject to any disclaimer, the term of this patent is extended or adjusted under 35 U.S.C. 154(b) by 25 days.

(21) Appl. No.: 12/737,486

(22) PCT Filed: Dec. 18, 2009

(86) PCT No.: PCT/US2009/006631
§ 371 (c)(1),
(2), (4) Date: Jan. 18, 2011

(87) PCT Pub. No.: WO2010/147575
PCT Pub. Date: Dec. 23, 2010

(65) Prior Publication Data
US 2011/0119936 A1    May 26, 2011

Related U.S. Application Data

(63) Continuation-in-part of application No. 12/214,585, filed on Jun. 20, 2008, and a continuation-in-part of application No. PCT/US2009/003690, filed on Jun. 18, 2009, and a continuation-in-part of application No. PCT/US2009/005368, filed on Sep. 29, 2009.

(51) Int. Cl.
*G01B 3/10* (2006.01)
(52) U.S. Cl. ......... 33/1 G; 33/700; 33/756; 33/DIG. 21; 702/152
(58) Field of Classification Search ................ 33/1 G, 33/700, 701, 756, 760, 762, DIG. 21
See application file for complete search history.

(56) References Cited

U.S. PATENT DOCUMENTS

| | | | |
|---|---|---|---|
| 4,249,314 A * | 2/1981 | Beck | 33/1 PT |
| 4,316,081 A * | 2/1982 | Washizuka et al. | 33/762 |
| 5,286,972 A * | 2/1994 | Falk et al. | 33/756 |
| 6,006,978 A | 12/1999 | Swanson | |
| 6,785,973 B1 | 9/2004 | Janssen | |
| 7,055,261 B2 * | 6/2006 | Nam | 33/760 |
| 7,395,609 B2 | 7/2008 | Powell | |
| 7,665,223 B2 * | 2/2010 | Swanson et al. | 33/756 |
| 2007/0033823 A1 * | 2/2007 | Steinich | 33/756 |
| 2008/0072443 A1 * | 3/2008 | Powell | 33/503 |

* cited by examiner

*Primary Examiner* — G. Bradley Bennett
(74) *Attorney, Agent, or Firm* — Palomar Patent; Calif Tervo

(57) ABSTRACT

The method uses a cable measurement and cable positioning or laser projection device to measure a structure to produce a digitized design of the structure and to put the design on a panel by laser pointer projection or by cable positioning so that the panel can be marked and cut for fitting on the structure.

15 Claims, 19 Drawing Sheets

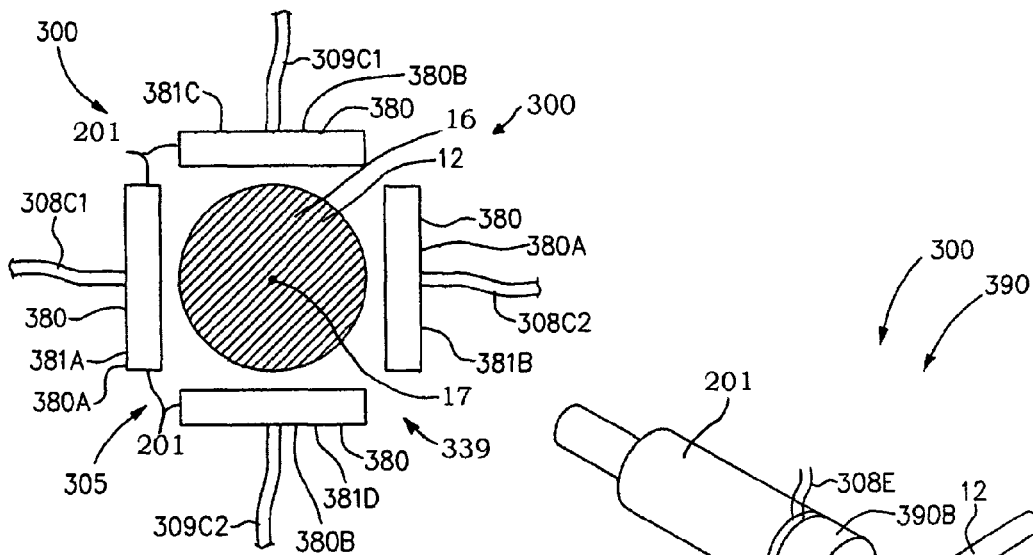
FIG. 9
FIG. 11
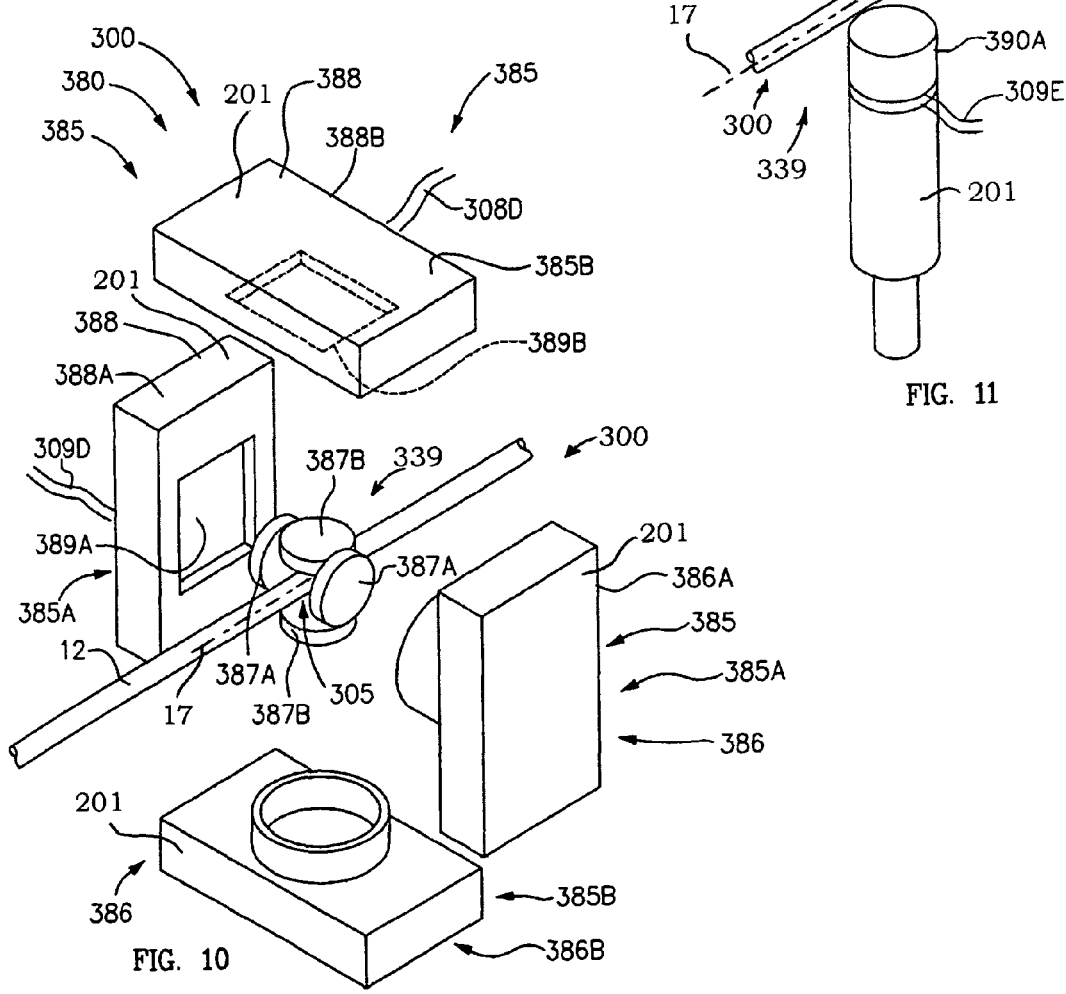
FIG. 10

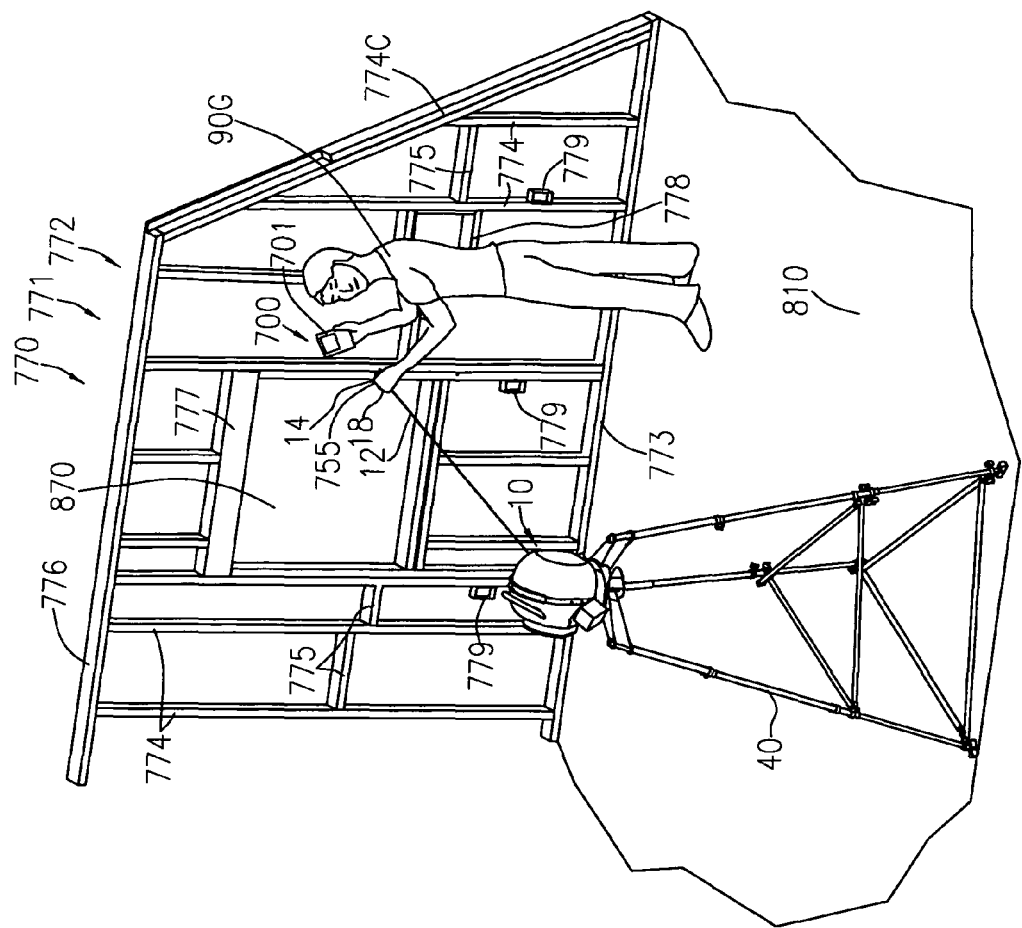
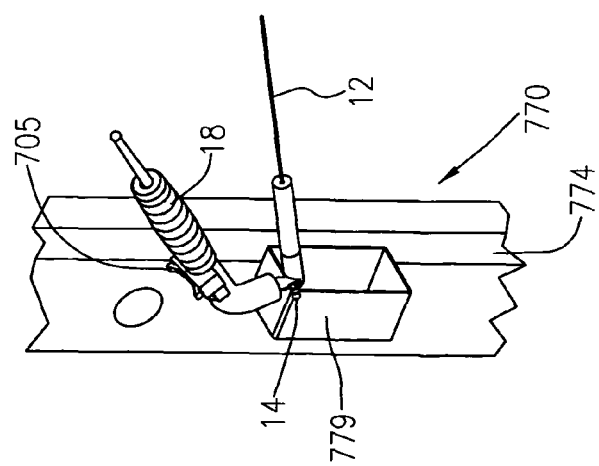

METHOD OF PREPARING A PANEL FOR FITTING TO A STRUCTURE

CROSS-REFERENCE TO RELATED APPLICATIONS

This application is a continuation-in-part and claims benefit of co-pending U.S. application Ser. No. 12/214,585, filed Jun. 20, 2008 titled Measuring Device with Extensible Cord and Method, PCT Application Number PCT/US2009/003690, filed Jun. 18, 2009 titled Measuring Device with Extensible Cord and Method, and PCT Application Number PCT/US09/05368, filed Sep. 29, 2009, which are incorporated herein in their entirety.

FIELD OF THE INVENTION

This invention relates in general to a method for preparing a panel, such as wallboard, drywall, aircraft skin, ship plate or counter tops, for fitting to a structure and more specifically involves a device including cable measurement for measuring the structure and including a laser pointer or an extensible cable for positioning pertinent design aspects of the structure the on the panel.

BACKGROUND OF THE INVENTION

Marking and cutting drywall for placement on a wall structure is difficult and time consuming. There is much room for error. A typical installer uses a tape measure and a pad of paper to determine the locations of studs, outlet boxes, windows, wiring, pipes, and other features of the wall structure. Then the installer uses the measurements, a tape measure and a pencil to produce a design of the wall structure on a sheet of drywall. This process is typically inexact and the installer often measures, marks, cuts and fits several times before the drywall is acceptable. The process is error prone, and it is common to drive drywall fastening screws through the drywall into wires and pipes. There are cases where installer have covered electrical outlet boxed and even windows. Fortunately, the allowable error is rather large because the final fitting is often far from perfect.

Therefore, it would be desirable to have a faster and more accurate method for measuring the wall structure and placing a design on the drywall.

SUMMARY OF THE INVENTION

The invention is a method for using a cable measurement and cable positioning or laser projection device to measure a structure to produce a digitized design of the structure and to put the design on a panel by laser pointer projection or by cable positioning so that the panel can be marked and cut for fitting on the structure.

A first embodiment of the device includes a cable measuring portion for measuring direction and distance to points on the structure, a computer for producing a digitized design of the structure from the measured points and an output portion including a laser pointer mounted on a gimbal driven by computer controlled served motors for projecting the produced design onto a panel. The method includes the steps of producing a digitized design of the structure by placing the cable free end seriatim on a sufficient number of points of the structure to define the structure with the computer in the input mode; positioning the device and panel at known relative position; and switching the computer to output mode to project the design.

In a second embodiment of the device, instead of the gimbal-mounted laser pointer, the output portion uses the cable for positioning the design and includes a cable tensioning motor for adjusting the force required to move the cable free end away from the base unit and cable direction means for directing a user to move the cable free end toward the portion of the design on the panel and the method of outputting design includes the steps of, responsive to the direction from the cable direction means, moving the cable free end toward a portion of the design, and moving the cable free end radially from the base unit to a distance of cable tension adjustment indicative that the free end is a distance to the portion of the design.

For outputting the design, the device may be placed in a known position and orientation relative to the panel, or the device may first be used as a cable measuring input device to measure the relative location and orientation of the workpiece.

Other features and many attendant advantages of the invention will become more apparent upon reading the following detailed description together with the drawings wherein like reference numerals refer to like parts throughout.

BRIEF DESCRIPTION OF THE DRAWINGS

FIG. 9 is a perspective schematic of a second embodiment of the cable angular displacement sensor in the form of contact sensors.

FIG. 10 is a perspective schematic of a third embodiment of the cable angular displacement sensor in the form of optical sensors.

FIG. 11 is a perspective schematic of a fourth embodiment of the cable angular displacement sensor in the form of a magnetic or electromagnetic sensor.

FIG. 20 is a perspective view of a grip user using the device for measuring a wall structure.

FIG. 21 is a perspective view showing cable measuring of an electrical outlet box.

DETAILED DESCRIPTION OF THE INVENTION

Figure 1:
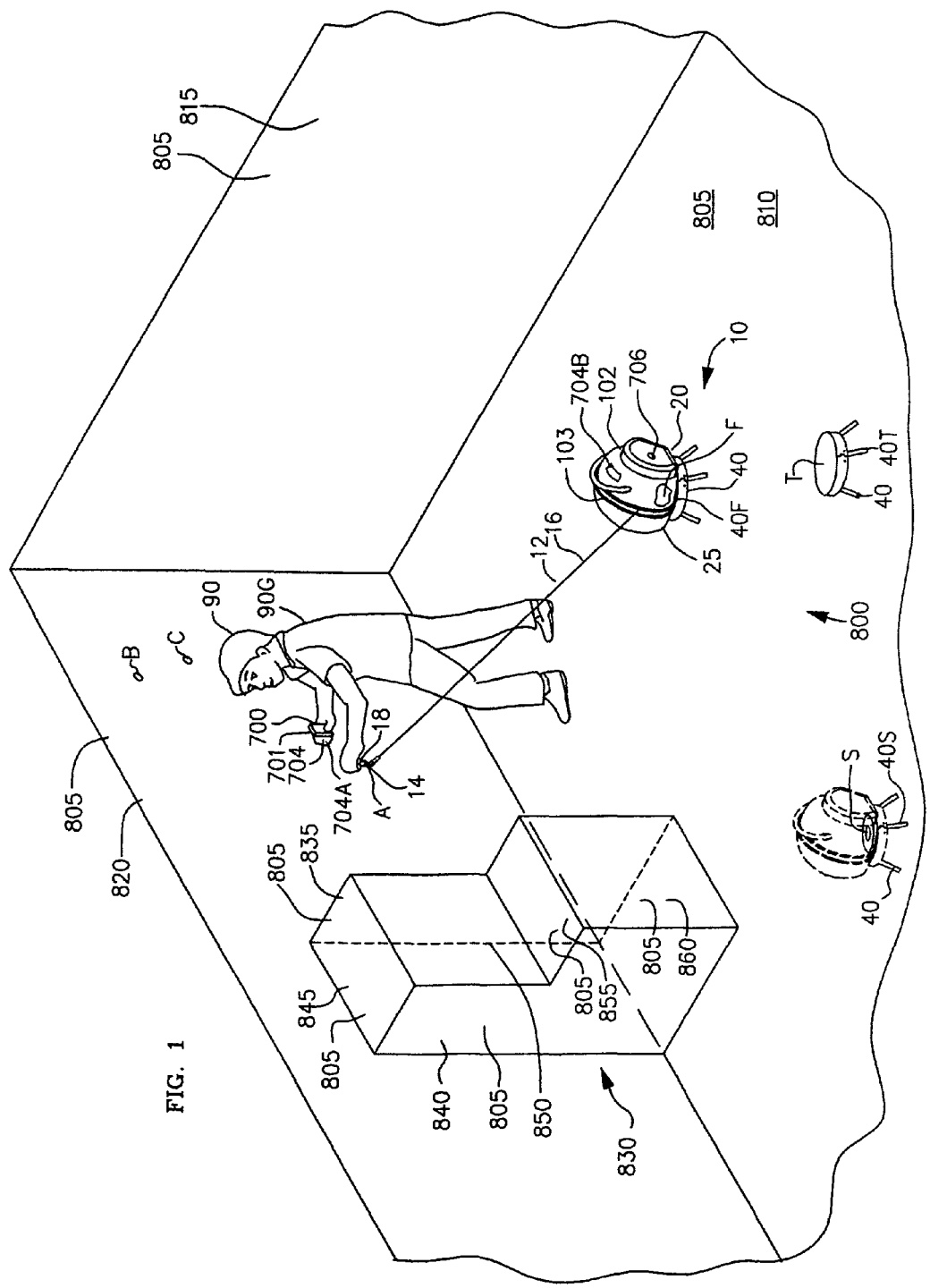
FIG. 1 is a perspective view of a room showing a use of the cable measuring and cable positioning or laser projecting device of the invention.

With reference now to the drawings, there is shown in FIG. 1 a perspective view of a room 800 showing a use of a first embodiment 10A of the cable measuring and cable positioning or laser projecting device 10 of the invention. A user 90 uses device 10 to obtain numerical coordinates, such as polar coordinates, of a plurality of points in room 800. By measuring the location of a relatively small number of points in room 800, device 10 can define all of the desired surfaces 805 in three-space for purposes of determining the amount or size of flooring, paint, wall coverings, windows, counter tops, cabinets and other features.

Device 10 may be used in a factory to measure the three-dimensional location of piping, or machinery details, or other generally difficult-to-measure objects.

Surfaces 805 of room 800 include a floor 810, back wall 815, and side wall 820. A hutch 830 abuts side wall 820. Surfaces 805 of hutch 830 include a right side wall 835, a left side wall 840, a top surface 845, an upper front wall 850, a lower surface 855, and a lower front wall 860.

Device 10 generally includes a retractable cable 12 having a midsection 16 and a free end 14; a base unit 20 supporting devices for tracking movement of cable 12 and for measuring the length and direction of cable 12, a computer 700, such as a personal digital assistant (PDA) 701 held by a user 90, and a user interface 704 to computer 700 such as an entry pad 704A on PDA 701 or key pad 704B on base unit 20.

Housing 102 is protective against dirt and damage and defines an orifice 103 for passage of cable 12. As will be explained in greater detail later, housing 102 rotates to follow cable 12 as cable 12 is moved. Base unit 20 is adapted to be firmly supported by a surface. Framework 25 of base unit 20 is firmly supported by a support 40, such as a floor plate placed on the floor or, such as shown in the exemplary embodiment, on a first tripod 40F placed on floor 810. Preferably, base unit 20 is selectively attachable to support 40 for purposes as will be explained.

A user 90, such as grip user 90G, grips a grip 18 attached to cable free end 14 and places free end 14 on a point, such as point A on side wall 820, the location of which is to be measured by device 10. Grip 18 is attached to cable 12 in a manner so as to not introduce a moment to cable 12 so as to keep cable 12 linear. The distance to point A and the direction to point A are measured by measuring devices in housing 102.

One or more computers 700 are used for data input, storage, and processing. In the preferred embodiment shown, grip user 90G uses a hand held computer 700, such as a personal digital assistant (PDA) 701. PDA 701 contains a program adapted for receiving and processing data input. A computer program for performing the functions described herein is readily commercially available or can be written by a programmer reasonably skilled in the art or an existing program can be readily adapted to the specifics of device 10 by a programmer reasonably skilled in the art. Alternatively, a computer 700 may be located in base unit 20 or be a separate unit.

In the exemplary embodiment, grip user 90G enters input on entry pad 704A of PDA 701. PDA 701 and base unit 20 have wireless connectivity, such as radio, such as Bluetooth®, and PDA 701 receives the cable measurements from base unit 20. Other wireless connectivity, such as IrDA (infrared), sound, or Wi-Fi could be used. Alternatively, other input and connectivity methods could be used. A separate cable could be used. Input could be transmitted via measuring cable 12. Data connectivity between computer 700, measuring devices, and grip user 90G allows just one person to be able to operate device 10 and measure room 800. A second user, not shown, could communicate with computer 700 in one of the above-described manners or furnish input via port 706 or on entry or key pad 704B on base unit 20.

Figure 13:
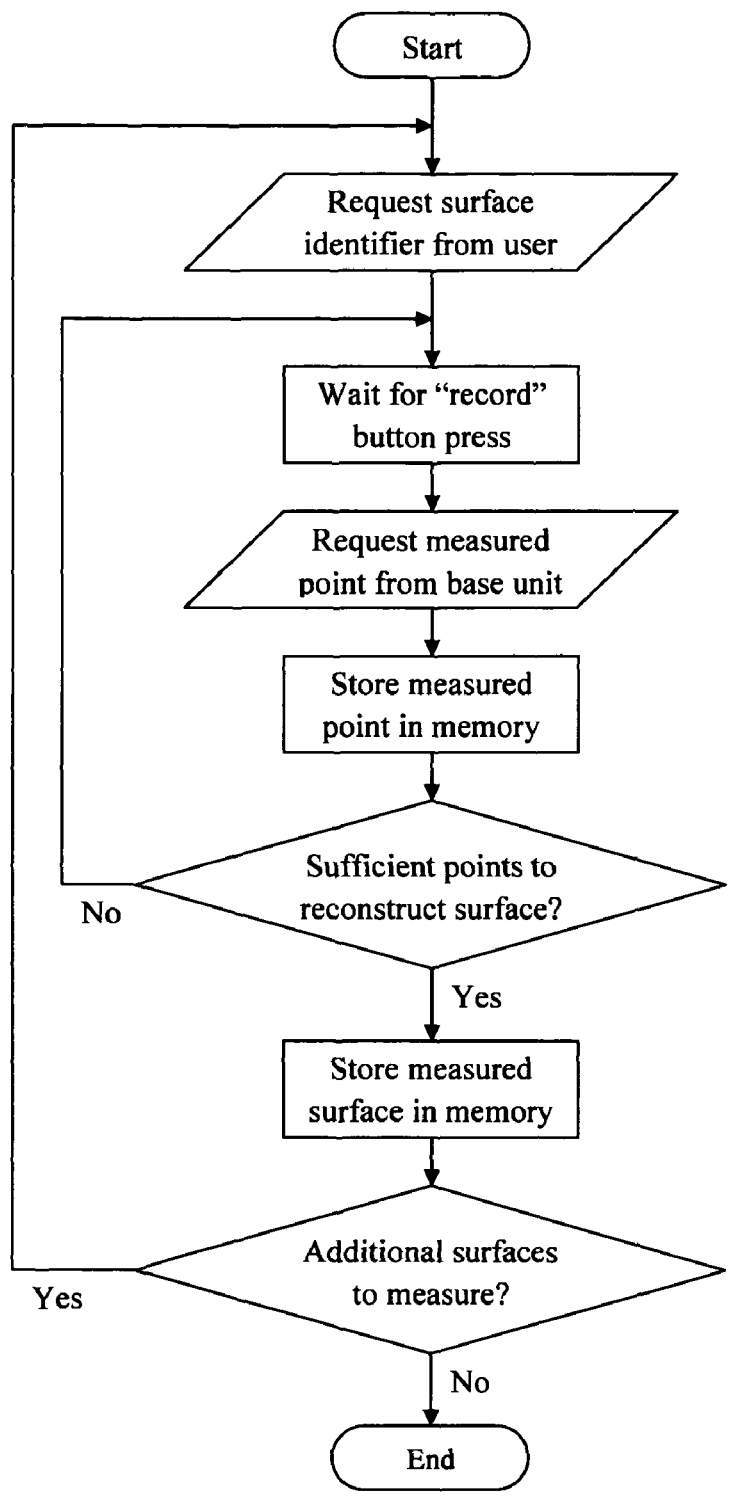
FIG. 13 is a flow chart for measuring a surface.

Turning momentarily to FIG. 13, there is shown a flow chart for taking measurement. A user inputs a surface identifier to identify the surface being measured for associating the measured points with. With cable free end 14 on a point to be measured on the surface, the user presses a "record" button. The measurements are recorded. If more points must be input to reconstruct the surface, then cable free end 14 is moved and additional points are recorded to memory for that surface. If not, then a new surface identifier is entered and points on that surface are measured.

In an exemplary use, user 90 places first tripod 40F firmly on floor 810 and attaches framework 25. The program in PDA 701 is activated for receiving data. Grip user 90G enters an identifier for a surface 805, such as side wall 820, to be measured. Grip user 90G enters an identifier for type of surface, for example "planar" for side wall surface 820, places cable free end 14 on a point, such as point A, on side wall 820, and presses a record button on PDA 701. The location of point A is determined by base unit 20 and is transmitted to PDA 701. This procedure is repeated with points B and C. PDA 701 now has in memory three points A, B, C that define a plane, of which side wall surface 820 is a part. The same procedure is used for other surfaces 805. Additional points on any surface 805 may be measured. The gathered data can be processed by computer 700 or sent, such as via port 706 or radio, such as with Bluetooth®, to another computer for processing.

From the measured data, imaging software, such as computer aided design (CAD) software reconstructs surfaces 820. Such software is well known in the art. An example is Geomagic Studio from Geomagic, Inc. Another software package for processing point data into three dimensions is RapidFormXOR from INUS Technology, Inc. and Rapidform, Inc.

Other identifiers for type of surface are used for more complex surfaces. For a surface identifier such as "smooth curve", the computer program could "fair" the associated measured points to arrive at the surface configuration. For each surface designation, one or more sub-designations may be used. For example, "edge" or "terminus" is used for designating an edge point or corner point on a surface respectively. For measuring more complex surfaces, a large number of points are measured or a "scan" sub-designation is entered and cable free end 14 is drawn along the surface and points are measured repeatedly If a surface 805 to be measured, such as hutch left end 840, cannot be measured by device 10 while mounted on first tripod 40F, such as because the surface 840 is not in the line of sight from first tripod 40F or cannot reached by cable end 14 from first tripod 40F, then an additional tripod, such as second tripod 40S, is placed in a suitable location for measuring surface 840. Each tripod 40 includes a reference point, such as point F, S or T, the location of which, relative to an attached base unit 20, is known. The location of reference point S on second tripod 40S is measured by device 10 to establish the spatial location of second tripod 40S relative to first tripod 40F. Base unit 20 is detached from first tripod 40F and attached to second tripod 40S. The reference point F on first tripod 40F is measured by base unit 20 on second tripod 40S to establish the angular orientation of base unit 20 on second tripod 40S relative to first tripod 40F. Points are measured from base unit 20 on second tripod 40S.

This tripod jumping pattern can be repeated to measure any surfaces 805. For example, to measure additional points that are not measurable from second tripod 40S, first tripod 40F, or another tripod 40T is moved to a suitable location for measuring the points. Its reference point F at the new location is measured, base unit 20 is detached from second tripod 40S and attached to the moved first tripod 40F, and reference point S of second tripod 40S is measured to establish the relative position of the new location.

If it is desirable to later add a surface 805 to the data or to later improve on or correct measured data from a surface 805, it is not necessary to re-input all of the measured points. Instead, to add a surface 805, base unit 20 is placed, as described above, in a position to both measure the additional surface 805 and to measure a plurality of points on already known surfaces 805. A "re-orientation" entry directs computer 700 to use the next measured points from known surfaces 805 to determine the location and orientation of base unit 20 by triangulation. The additional points or surface 805 can then be measured and added to the previously measured data.

Figure 2:
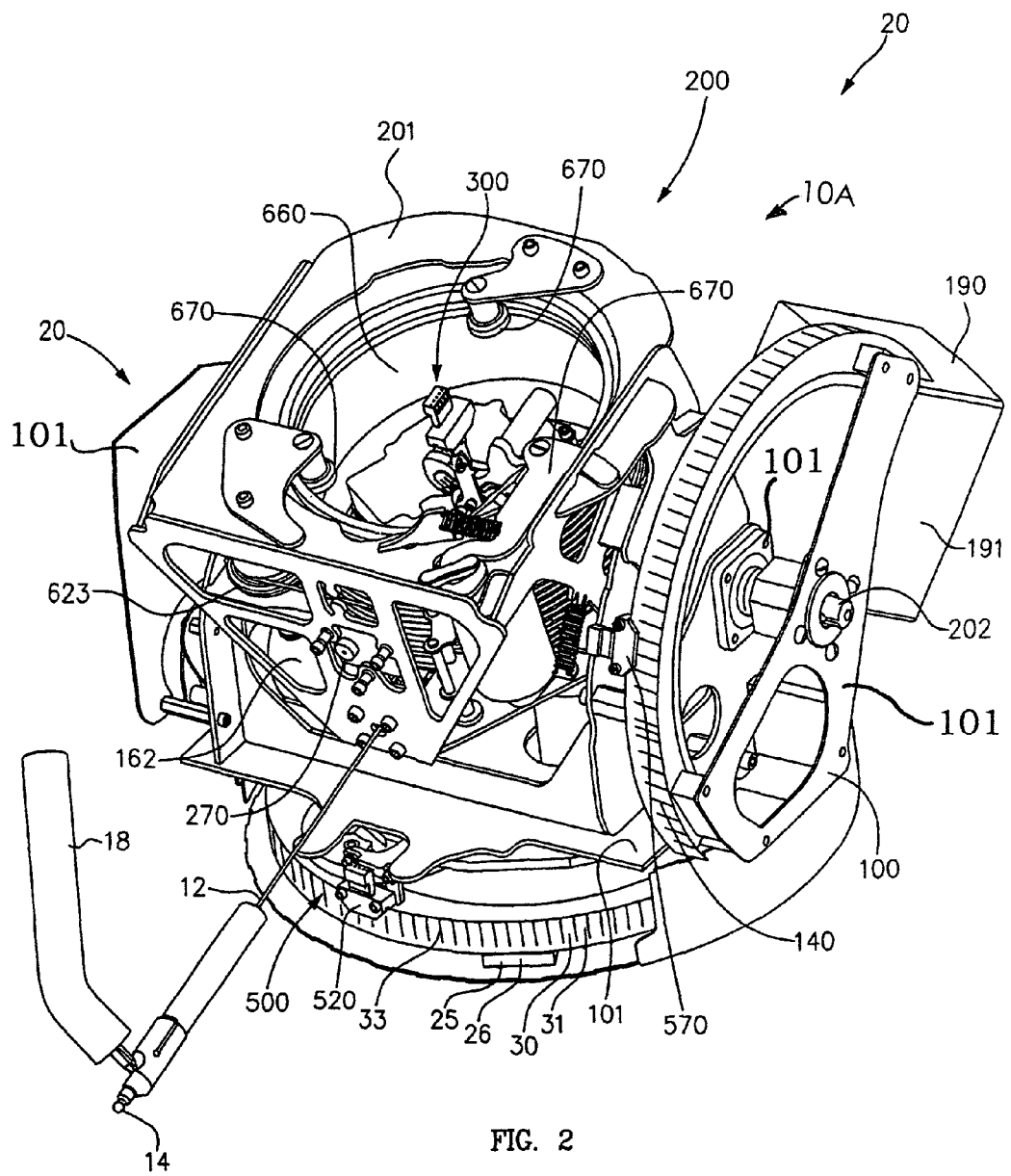
FIG. 2 is a top, front, right side, partially cut away, perspective view of selected elements of the base unit of the device.
Figure 3:
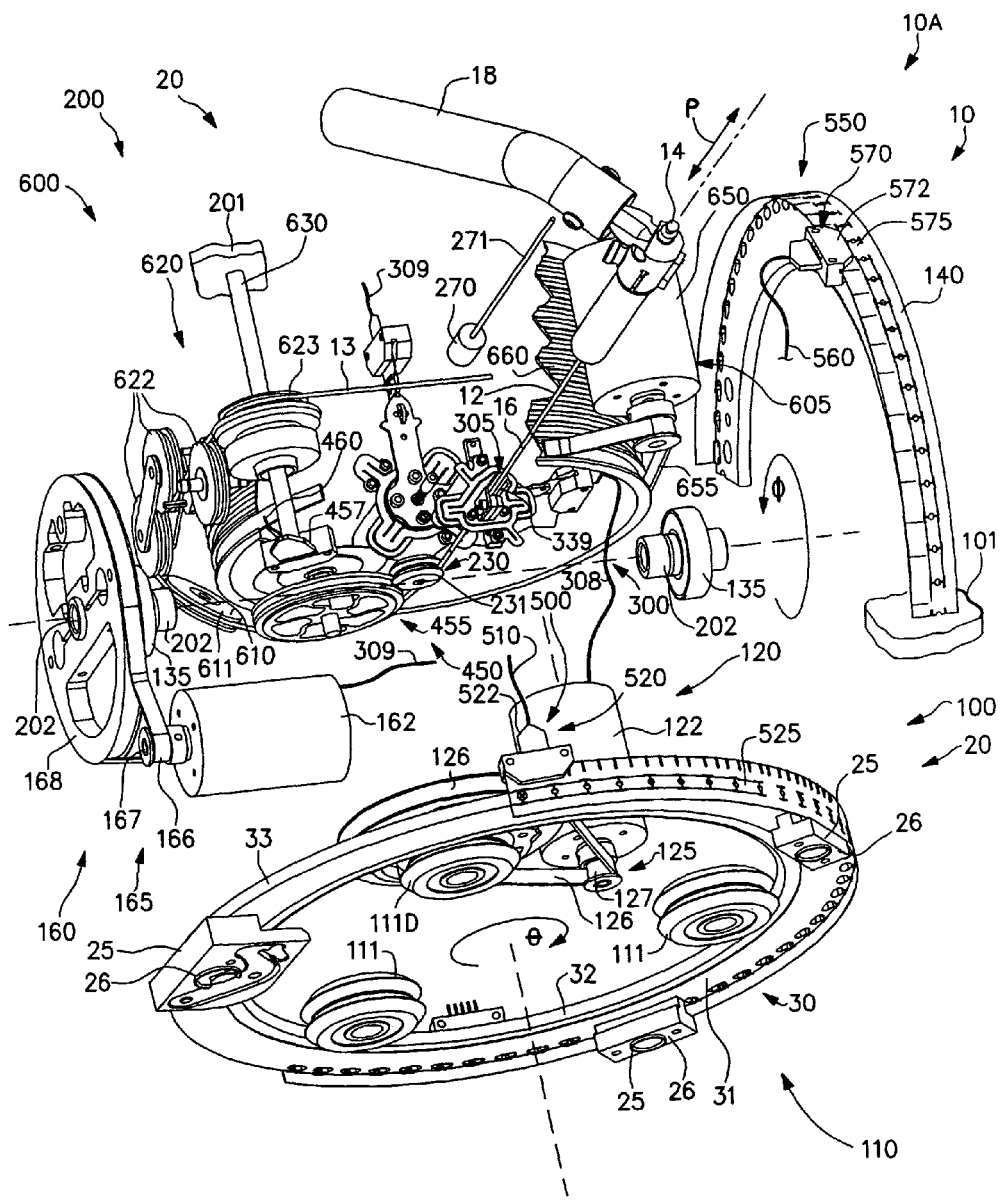
FIG. 3 is a bottom, front, left side, partially cut away, perspective view of selective elements of FIG. 2.

FIG. 2 is a top, front, right side, partly cut away, perspective view of selected elements of the base unit 20 of device 10. FIG. 3 is a bottom, front, left side, perspective view of selected elements of FIG. 2. FIGS. 2 and 3 will be used to explain the overall functions of device 10. Pertinent elements will be later discussed in greater detail. A cable 12 includes a free end 14, a supply end 13, and a midsection 16 therebetween. Free end 14 is for placement on a point, the location of which is to be measured, such as point A on FIG. 1. A grip 18 attached to free end 14 of cable 12 is used, such as by gripping by user 90G, for positioning free end 14 at a point to be measured.

Base Unit 20 includes measuring means coupled to cable 12 for measuring direction and distance to each point and for producing measurement signals indicative. Base unit 20 generally includes framework 25 for attachment to floor support 40, a base 30 attached to framework 25, a turn carriage 100 rotationally mounted on base 30, and a pitch carriage 200 rotationally mounted on turn carriage 100.

Framework 25 includes means, such as a plurality of cooperative connectors 26 for cooperating with support 40 for selectively attaching framework 25 to support 40.

Base 30 includes a ring 31 attached to and supported by framework 25. Ring 31 has a circular inner face 32 and a circular outer face 33.

Turn carriage 100 includes a plurality of components attached to a turn-carriage frame 101. In FIG. 3, frame 101 is only partially shown for clarity. Turn carriage 100 includes means 110, such as a plurality of wheels 111, for rotationally mounting turn carriage 100 on base 30. Wheels 111 including drive wheel 111D, are mounted on frame 101 and rotationally mount turn carriage 100 on inner face 32 of ring 31 of base 30.

Turn carriage 100 is rotationally attached to base 30 so as to be rotatable about a yaw axis, such as first axis or turn axis $\theta$ (theta). Turn axis $\theta$ is typically perpendicular to the floor or other support 40 for base unit 20. Thus, turn axis $\theta$ typically is vertical or substantially vertical. Turn carriage 100 can rotate left or right and any number of degrees to align cable 12 in any direction.

Base unit 20 includes power means 190, such as a battery 191 for powering components. Battery 191 is attached to base unit 20, such as to turn-carriage frame 101. Power is distributed from battery 191 to the components by any desirable means, such as power lines, not shown.

Pitch-carriage mounting means, such as a pair of spaced bearings 135 are attached to frame 101 for rotational mounting of pitch carriage 200.

Pitch carriage 200 includes a plurality of components attached to pitch-carriage frame 201. In FIG. 3, frame 201 is only partially shown for clarity. Pitch carriage 200 is rotationally attached to turn carriage 100, such as by shafts 202 attached to frame 201 and journaled in bearings 135, so as to be rotatable about a second or pitch axis $\phi$ (phi) defined by bearings 135. In the exemplary embodiment, pitch carriage 200 may pitch down at an angle of about 35° and rotate upward from there through an angle of about 92° for 127° total motion.

A main datum passage 230 is attached to frame 201 and defines an inner, confined passage relative to frame 201 for midsection 16 of cable 12. In the exemplary embodiment, a main datum passage device attached to pitch carriage frame 201, such as pulley 231 rotationally attached to pitch carriage frame 201, provides main datum passage 230. Main datum passage 230 is where incoming cable 12 first touches main datum pulley 231 when received from an outer confined incoming datum passage 339, as will be subsequently described. Main datum passage 230 provides the first pivot point that is fixed relative to frame 201 for incoming cable 12. Other embodiments of main datum passage 230 could include a ring orifice or the entrance to a tube or similar opening for confined passage of cable 12.

In the preferred embodiment shown, second axis $\phi$ is perpendicular to and intersects turn axis $\theta$. Main datum passage 230 is located at, or near, this intersection. Consequently, the relative polar coordinates $\rho$, $\theta$, $\phi$ of cable end 14 may be rather straightforwardly produced from main datum passage 230. However, other relative axes may be used and the measurements to the point may then be mathematically transformed as is well known in the art, into any desired coordinate system.

A cable supply means 600 is attached to frame 201 and supplies cable 12 from supply end 13 under a predetermined tension to main datum passage 230. In the exemplary embodiment, cable supply means 600 includes a drum or reel 660, upon which cable 12 is wound and a cable tensioning means 605 including a cable tension sensor 610 for sensing the tension in cable 12 supplied to main datum passage 230, and a reel servoed motor 650 coupled to reel 660 such as by belt 655 for rotating reel 660. Reel mounting means, such as a plurality of rollers 670, is mounted to pitch frame 201 for supporting reel 660 such that it may rotate for storage or release of cable 12. In the exemplary embodiment, cable tension sensor 610 includes a sensor and a roller pulley 611 that is spring biased to push against cable 12 between other cable supports. Sensor 610 senses the location of pulley 611 and produces a signal representative thereof. Responsive to the signal from tension sensor 610, reel servoed motor 650 rotates reel 660 to maintain the predetermined tension. Alternatively, computer 700 receives the signal from tension sensor 610 and directs reel servoed motor 650 to maintain a desired tension. In this manner, the desired tension may easily be changed in computer 700 by a user Other cable tension sensing means well-known in the art could be used, such as a load cell to measure load on pulley 611.

Cable positioning means 620 attached to frame 201 includes a plurality of pulleys 622 feeding cable 12 to or receiving cable 12 from a final positioning pulley 623. Final positioning pulley 623 is mounted on a shaft 630 attached to frame 201 so as to slide axially along shaft 630 and feed cable 12 to reel 660 such that cable 12 does not overlap on reel 660.

Cable length measuring means 450 is attached to frame 201 and is coupled to cable 12 for measuring the length $\rho$ (rho) or change of length of cable 12 as free end 14 is moved and placed on a point. Cable length measuring means 450 produces a signal, such as on line 460, indicative of the length $\rho$ (rho) or change of length of cable 12. Cable length measuring means of various configurations are well known in the art. In the illustrative embodiment, cable 12 is partially wrapped around a pulley 455 such that movement of cable 12 rotates pulley 455. A sensor 457, as is well known in the art, such as an optical encoder, translates amount of rotation of pulley 455 to change in cable length and produces a signal indicative thereof.

Pitch carriage 200 includes an angular displacement sensor assembly 300 attached to frame 201 including an incoming confined cable passage 339 for cable 12 between main datum passage 230 and cable free end 14. Cable 12 is in alignment position when the local longitudinal axis 17 of cable 12 at incoming confined cable passage 339 is aligned with main datum passage 230. As cable free end 14 is moved from an old point to a new point that is not directly radially outward from the old point, cable midsection 16 is displaced angularly in angular displacement sensor assembly 300. Angular displacement sensor assembly 300 detects this angular displacement of cable 12 away from alignment position 305 and produces a signal or signals indicative thereof, such as on lines 308 and 309. Angular displacement sensor assembly 300 will be discussed in greater detail later herein.

Turn servoed motor assembly 120 rotates turn carriage 100 about turn axis $\theta$ responsive to the signal from angular displacement sensor assembly 300 indicative of cable displacement about turn axis ($\theta$) so as to move angular displacement sensor assembly 300 toward alignment position 305. As illustrated, turn servoed motor assembly 120 includes a turn servoed motor 122 mounted on turn carriage 100 and a first drive mechanism 125 including a belt 126 connected to first drive wheel 127 connected to drive wheel 111D interacting with inner face 32 of ring 31 of base 30 for rotating turn carriage 100 relative to base 30 and about turn axis $\theta$. As used herein, the term "servoed motor" may apply to any kind of applicable motor actuator such as a servo motor, a stepper motor, or a hydraulic motor for example.

Pitch servoed motor assembly 160 couples pitch carriage 200 to turn carriage 100 for rotating pitch carriage 200 in bearings 135 about pitch axis p responsive to the signal from angular displacement sensor assembly 300 indicative of cable 12 movement about pitch axis $\phi$ so as to move angular displacement sensor assembly 300 toward alignment position 305. As shown, pitch servoed motor assembly 160 includes a pitch servoed motor 162 mounted on frame 101 and a pitch drive mechanism 165 including a belt 166 connecting first drive wheel 167 with second drive wheel 168 connected to journal shaft 202 of pitch carriage 200 for rotating pitch carriage 200 in bearings 135.

A turn-carriage measuring means 500 measures the rotational position or change of rotational position of turn carriage 100 relative to base 30 and produces a signal, such as on line 510, indicative thereof. Many such measuring means are well-known in the art. In the exemplary embodiment, an optical encoder 520 includes an optical reader 522 mounted on turn carriage 100 for reading an encoder strip 525 on base 30. When cable 12 is measuring a point, turn carriage measuring means 500 measures the direction of cable 12 about turn axis $\theta$.

A pitch-carriage measuring means 550 measures the rotational position or change of rotational position of pitch carriage 200 relative to turn carriage 100 and produces a signal indicative thereof. When cable 12 is measuring a point, pitch carriage measuring means 500 measures the direction of cable 12 about pitch axis $\phi$.

Many such measuring means are well-known in the art. In the exemplary embodiment, pitch-carriage measuring means 550 includes an optical encoder 570 including an optical reader 572 mounted on pitch carriage 200 for reading an encoder strip 575 on arc 140 of turn carriage 100 and for producing a signal indicative of the pitch on signal line 560.

In this manner, turn and pitch carriages 100, 200 rotate so as to follow the movement of free end 14 of cable 12 to a new measured point or between an old measured point and a new point until cable midsection 16 is once again in alignment position 305 in angular displacement sensor assembly 300. At this time, the position of the new point or the change in position of the new point relative to the old point can be determined, such as by computer 700 in response to the signals on lines 460, 510, 560 from measuring means 450, 500, and 550.

The measured point's location may be determined from the signals on 460, 510, and 560, for the purpose of reconstructing the measured surface, by mathematical means well known in the art. In the exemplary embodiment, computer 700 interprets the signals on lines 460, 510, and 560 as representing the $\rho$, $\theta$, and $\phi$ components of a point P (not shown) in a polar coordinate system. Because the force of gravity tends to displace the cable midsection 16 downward along a catenary curve, the measured location of cable free end 14 is not coincident with point P, but contains an offset dependent on the cable's extended length, the cable's orientation relative to the force of gravity, the cable's density per unit length, and the cable's tension. Computer 700 determines the offset from these known parameters using mathematical means well-known in the art to determine the measured location of cable free end 14 relative to point P. For increased accuracy, an accelerometer or other level sensor (not shown) may be mounted in base unit 20, such as to pitch carriage 200, for the purpose of determining the cable's precise orientation relative to the force of gravity.

The location signals on distance signal line 460, rotation signal line 510, and pitch signal line 560 are stored in connection with the measured point. This can be done in any desirable manner, such as in a local computer in base unit 20, not shown, or, as in the illustrative example, transmitted, such as by Bluetooth®, to PDA 701.

Signal communication within base unit 30 may be performed in any desirable manner. The exemplary configuration uses wires. Wires are easily used for connectivity because the only relative movement between sending elements and receiving elements is the change in pitch angle $\phi$.

FIGS. 4-8 are views of an illustrative embodiment of an angular displacement sensor assembly 300, such as gimbaled angular displacement sensor assembly 300G, including a biased main gimbal 310 in the form of a plate gimbal. Nine other embodiments of angular displacement sensor assembly 300 are shown in later figures and described therewith. Angular displacement sensor assembly 300 is attached to second frame 201 and includes a confined incoming datum passage between main datum passage 230 and cable free end 14 wherein cable 12 is in alignment position 305 when the local longitudinal axis 17 of cable 12 is aligned with datum passage 230. Angular displacement sensor assembly 300 senses the angular displacement of cable 12 away from alignment position 305 and produces a displacement signal, such as on lines 308, 309 indicative thereof. The displacement signal instructs turn servo motor 122 and/or pitch servo motor 162 to move turn carriage 100 and/or pitch carriage 200 such that cable 12 is returned to cable alignment position 305.

Figure 4A:
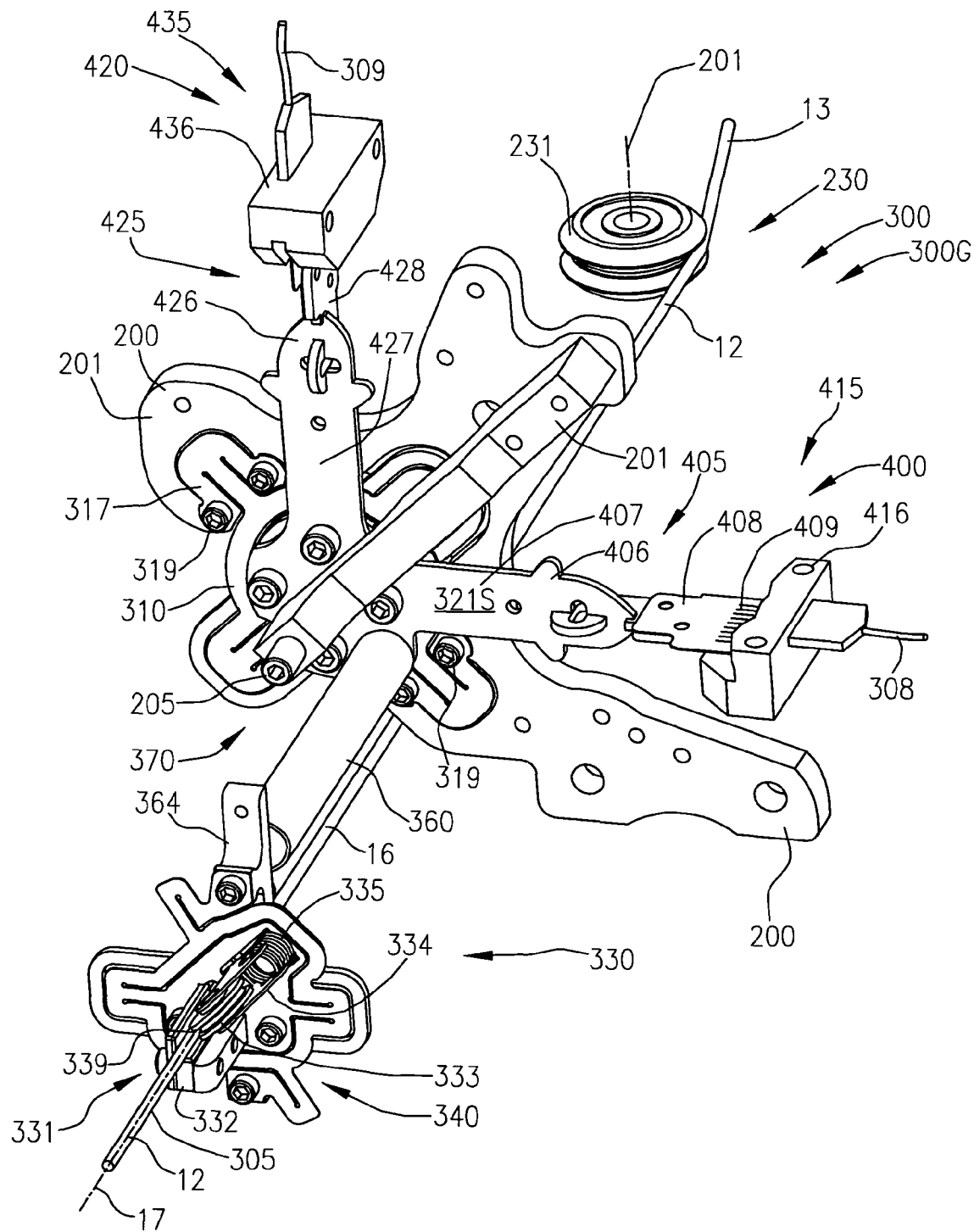
FIG. 4A is a front, top, right side perspective view of the cable angular displacement sensor including a biased main gimbal in the form of a plate gimbal.
Figure 4B:
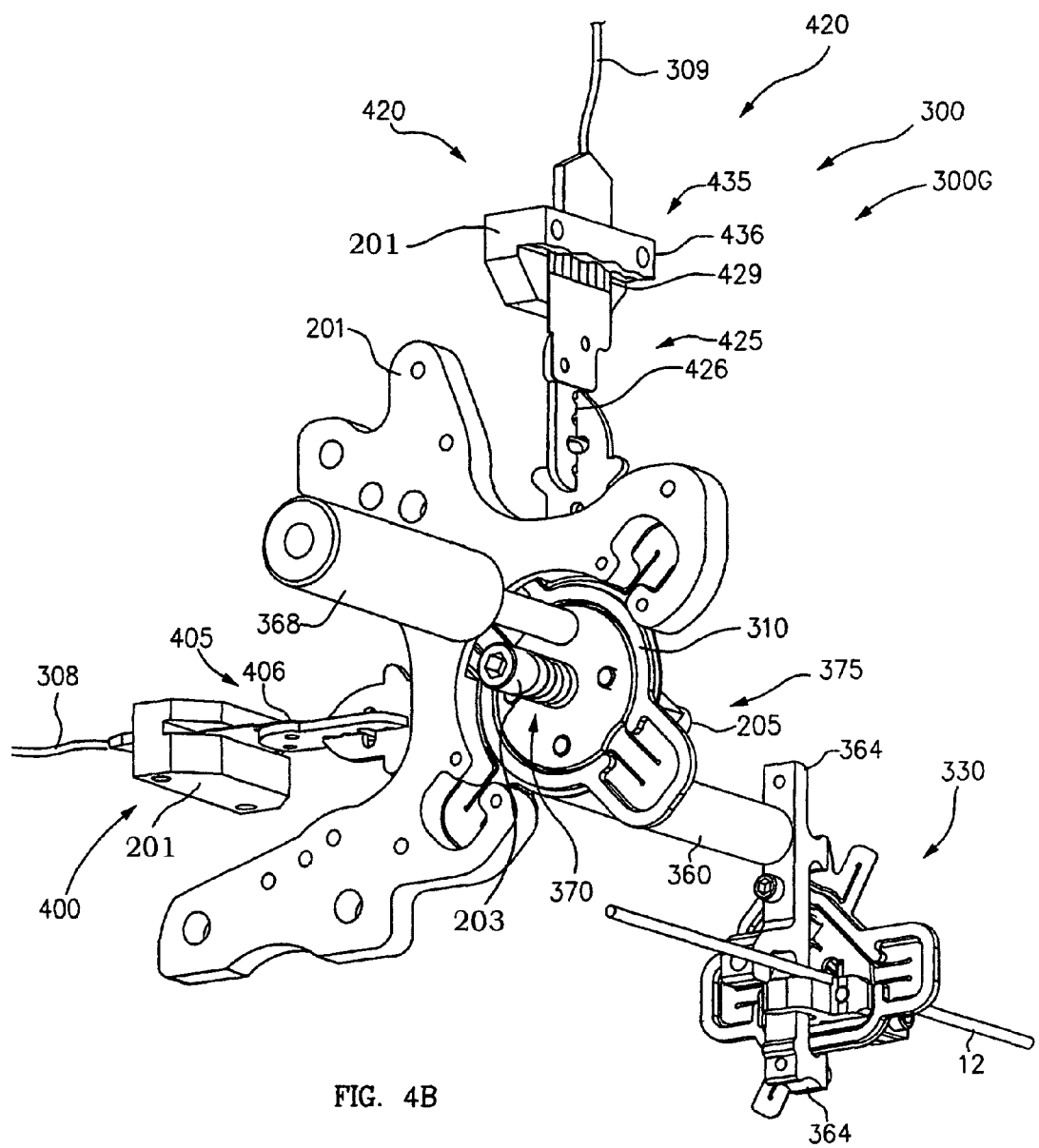
FIG. 4B is a back, bottom, left side perspective view of the cable angular displacement sensor of FIG. 4A.
Figure 5:
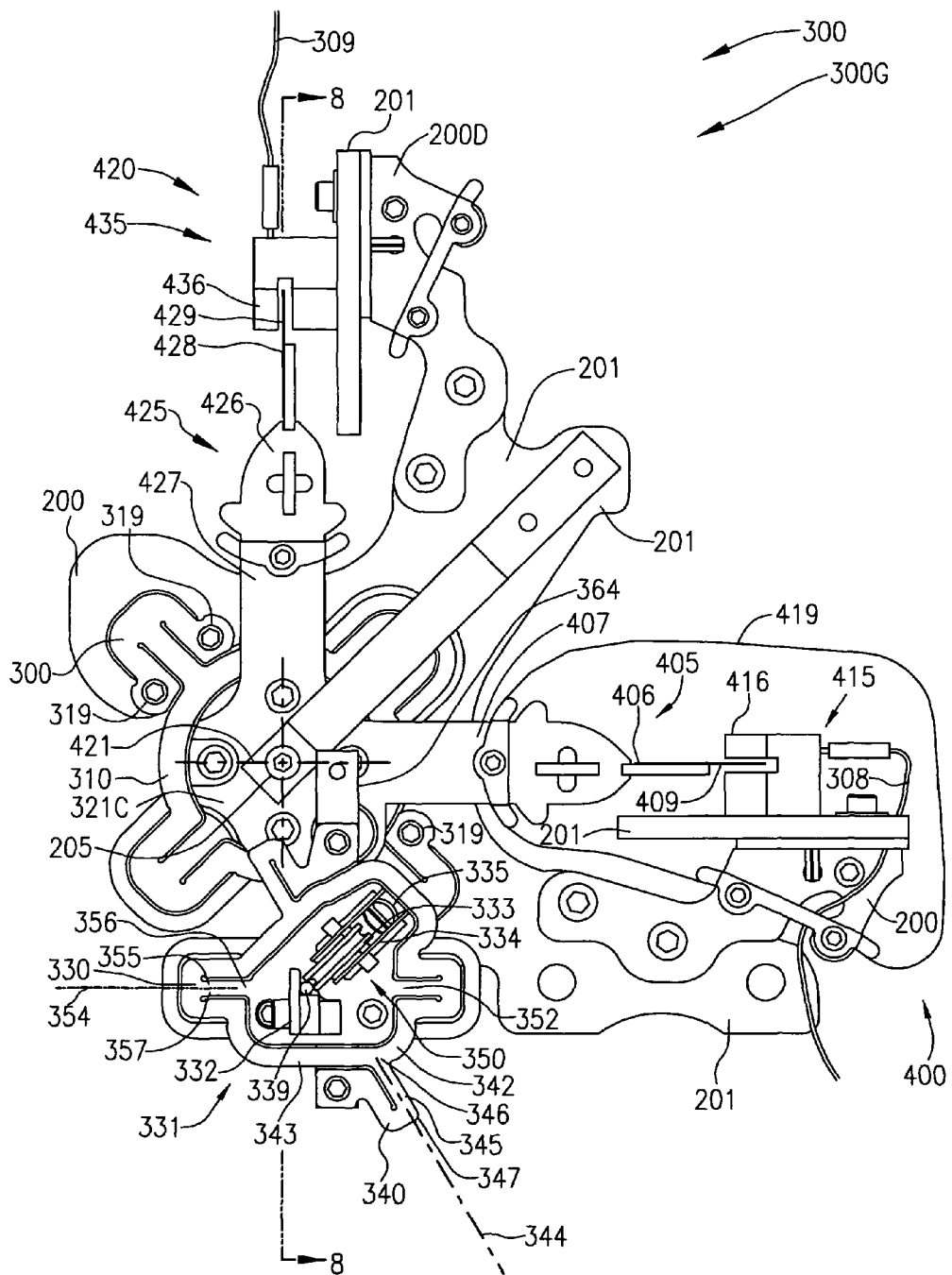
FIG. 5 is a front elevation view of the main angular displacement gimbal of FIG. 4A and FIG. 4B.
Figure 6:
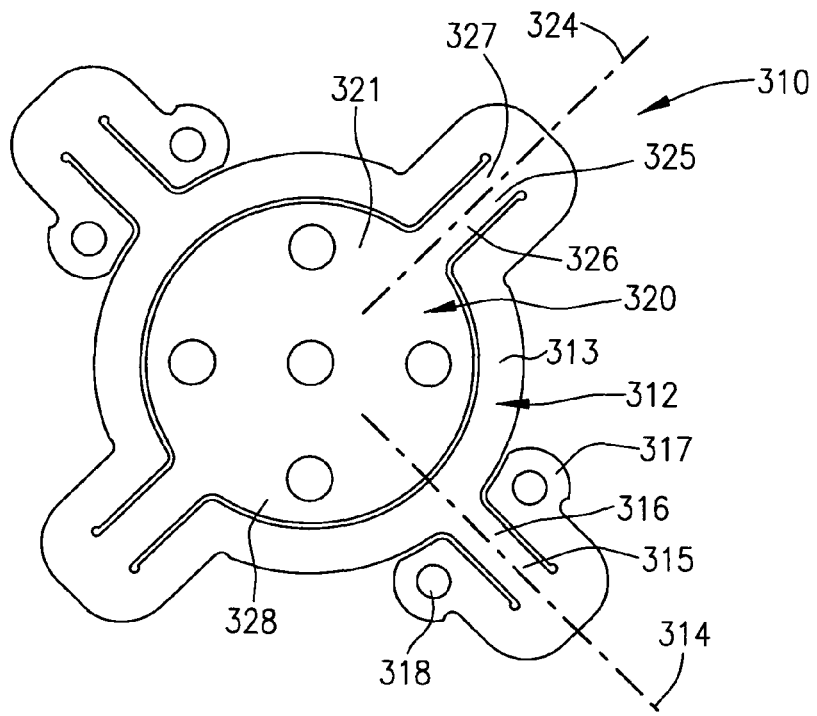
FIG. 6 is an enlarged front elevation view of the plate gimbal of FIG. 5.
Figure 7:
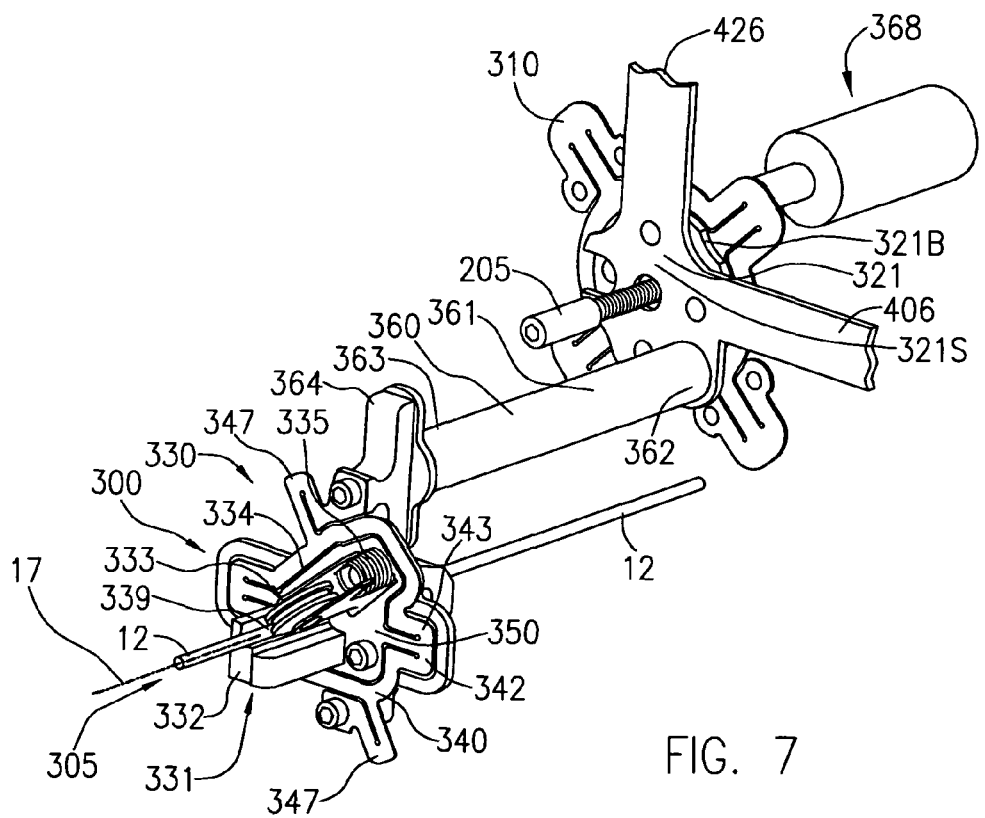
FIG. 7 is an enlarged front, top, right side, perspective of the cable passage assembly of FIGS. 4 and 5.
Figure 8:
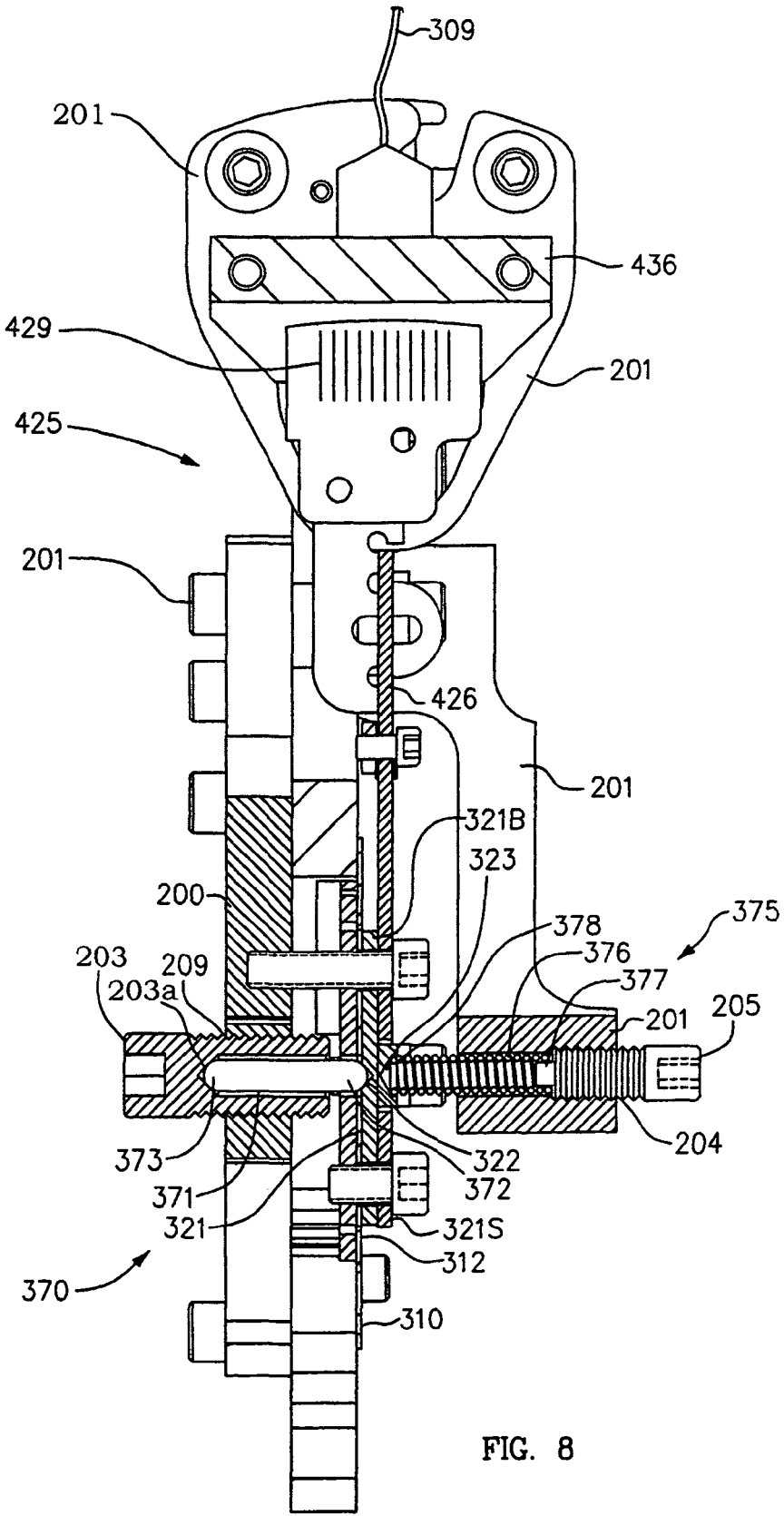
FIG. 8 is an enlarged cross sectional view of the main gimbal thrust bearing assembly.

FIG. 4A is a front, top, right side perspective view of the cable angular displacement sensor assembly 300G including a biased main gimbal 310 in the form of a plate gimbal attached to a portion of pitch-carriage frame 201. FIG. 4B is a back, bottom, left side perspective view of the cable angular displacement sensor assembly 300G of FIG. 4A. FIG. 5 is a front elevation view of the angular displacement sensor assembly 300G of FIG. 4A. FIG. 6 is an enlarged front elevation view of main gimbal 310 of FIGS. 4A and 4B. FIG. 7 is an enlarged front, top, right-side perspective view of the cable passage assembly 330 of FIGS. 4A, 4B and 5. FIG. 8 is an enlarged cross sectional view of main gimbal thrust bearing assembly 370 and biasing assembly 375 of FIG. 5.

Turning for a moment to FIG. 6, there is shown an enlarged front elevation view of main gimbal 310 of FIGS. 4 and 5. Main gimbal 310 is a planar, two axis biased gimbal comprising an outer gimbal 312 and an inner gimbal 320. Outer gimbal 312 includes an outer gimbal ring 313 supported by the inner ends 316 of a pair of outer torsion members 315 on a first gimbal axis 314. Note that "ring" is used due to gimbal tradition, but this element may be any functional shape. Bores 318 receive fasteners 319, such as bolts, as seen in FIGS. 4A and 5, that fasten outer ends 317 of outer torsion members 315 to pitch carriage 200. Inner gimbal 320 includes an inner gimbal ring 321 supported by the inner ends 326 of a pair of inner torsion members 325 on a second gimbal axis 324. Inner torsion members 325 are supported at their outer ends 327 by outer gimbal ring 313. Outer gimbal ring 313 is free to rotate about first gimbal axis 314. Inner gimbal ring 321 is free to rotate about second gimbal axis 324 relative to outer gimbal ring 313 and, thus, may rotate in any direction. Main gimbal 310 is a biased gimbal, in that gimbal rings 313, 321 are biased to rotate to a neutral position when rotational forces are removed. In main gimbal 310, the neutral bias is provided by paired torsion members 315, 325.

Returning to FIGS. 4, 5, 7 and 8, the other main components of angular displacement sensor assembly 300G are a cable passage assembly 330, a gimbal thrust bearing assembly 370, a biasing assembly 375, a first angular displacement sensor 400, and a second angular displacement sensor 420.

FIG. 7 is an enlarged front, top, right side, perspective of the cable passage assembly 330 of FIGS. 4 and 5. Cable passage assembly 330 is mounted on sensor arm plate 321S of inner ring 321 (not seen) of main gimbal 310 and rotates inner ring 321 responsive to angular displacement of cable 12 from cable alignment position 305. An arm 360, such as thin tube 361, has an inner end 362 connected to inner gimbal ring 321 and an outer end 363 including a bracket 364, best seen in FIG. 4B.

An anti-moment gimbal 340, such as a plate gimbal, is mounted on bracket 364. Anti-moment gimbal 340 is a planar, two axis biased gimbal similar to main gimbal 310 and comprises an outer gimbal 342 and an inner gimbal 350. As best seen in FIG. 5, outer gimbal 342 includes an outer gimbal ring 343 supported by the inner ends 346 of a pair of outer torsion members 345 on a first gimbal axis 344. Outer torsion members 345 are supported at their outer ends 347 by bracket 364. Inner gimbal 350 includes an inner gimbal ring 352 supported by the inner ends 356 of a pair of inner torsion members 355 on a second gimbal axis 354. Note that "ring" is used due to gimbal tradition, but this element may be any functional shape. Inner torsion members 355 are supported at their outer ends 357 by outer gimbal ring 343. Outer gimbal ring 343 may rotate about first gimbal axis 344. Inner gimbal ring 352 may rotate about second gimbal axis 354 relative to outer gimbal ring 343 and, thus, may rotate in any direction.

Incoming cable passage members 331, including dihedral blocks 332 and a biased pulley 333, define a confined incoming datum passage, such as confined passage 339, for confined passage of midsection 16 of cable 12. Passage members 331 are mounted on inner ring 352 of anti-moment gimbal 340. Pulley 333 is mounted on a swinging yoke 334 and biased toward the cable confining position by a spring 335. This biasing allows pulley 333 to move slightly to allow for passage of protuberances on cable 12. Of course, there are many other manners of accomplishing this confined cable passage 339. For example, instead of dihedral blocks 332, a second pulley could be used, or a plurality of rollers could be used.

Anti-moment gimbal 340 decouples sensor assembly 300G from applying any moment to cable 12 in confined cable passage 339. Anti-moment gimbal 340 may not be necessary for all types of cable 12.

As seen in FIG. 7, a counter mass 368 may be attached to the back side of inner gimbal ring 321 to counter the mass of arm 360 and cable passage assembly 330 so as to balance main gimbal 310 to a more planar neutral position.

As best seen in FIGS. 3 and 4A, cable 12 is in the alignment position 305 when local longitudinal axis 17 of cable 12 in confined passage 339 is aligned with main datum passage 230 and main gimbal 310 and anti-moment gimbal 340 are in the neutral position. With cable 12 in alignment position 305, the measurement of a point may be taken. Cable free end 14 is then moved to a new point for measurement. If cable midsection 16 is displaced angularly during movement to the new point, midsection 16 exerts a side force against outer cable passage members 331 which, through arm 360, exert a moment on inner gimbal ring 321 of main gimbal 310 so as to rotate it.

FIG. 8 is an enlarged cross sectional view of gimbal thrust bearing assembly 370. Thrust bearing assembly 370 provides a front-to-back pivot point for inner gimbal ring 321 and also may bias or pre-load inner gimbal ring 321 to a position out of the planar position. A pivot rod 371 includes a front end 372 and a back end 373. Inner gimbal ring 321 includes a bearing plate 321B attached to the front of inner gimbal ring 321. Bearing plate 321B includes a rear facing pivot seat 322 and a front facing pivot seat 323. The front end 372 of pivot rod 371 and rear facing pivot seat 322 are adapted such that bearing plate 321B, and hence inner gimbal ring 321, pivots on front end 372. Preferably, also, pivot rod back end 373 and pitch frame 201 are adapted such that pivot rod back end 373 pivots on pitch carriage 200. These functions can be implemented in many manners. In the exemplary embodiment, pivot rod front end 372 is curved, such as being hemispherical. Mounted on or integral with inner gimbal ring 321 and moving therewith are a bearing plate 321 B and sensor arm plate 321S. Bearing plate 321B includes a concave conical pivot seat 322 for receiving front end 372 in a pivoting relationship. Pitch frame 201 includes a set screw 203 adjustably threadably engaged in threaded bore 209. Set screw 203 includes a front-facing, concave, conical pivot seat 203a for receiving pivot rod back end 373. Pivot rod back end 373 is curved, such as being hemispherical, for pivoting in seat 203a. Note that pivot rod 371 pivots on both ends 372, 373 such that it only can apply an axial force and, other than its own weight, pivot rod 371 cannot apply a side load or moment to main gimbal 310. Pivot rod 371 cannot carry any of the weight of main gimbal 310 or its attachments including anti-moment gimbal 340.

Because main gimbal 310 may exhibit tensional discontinuities at the planar position, set screw 203 is adjusted so that inner gimbal ring 321 is out of planar with the remainder of main gimbal 310.

Means, such as a biasing assembly 375, may be used to further assure that inner gimbal ring 321 is positioned at a particular front-to-rear position against pivot rod 371. To this end, a compression member, such as spring 376, bears against pitch frame 201 and inner gimbal ring 321 to bias inner gimbal ring 321 against pivot rod 371. Spring 376 includes a front end 377 and a back end 378. Pitch frame 201 includes means, such as a set screw 205 adjustably threadably engaged in threaded bore 204, for bearing on spring front end 377 for adjusting the compression biasing of spring 376. Spring back end 378 bears on inner gimbal ring 321, such on bearing plate 321B, such as on front seat 323 thereon. Spring 376 and inner gimbal ring 321 may be adapted (not shown), such as with a hemispherical cap on spring 376 and a concave conical seat on inner gimbal ring 321 for receiving the cap, such that spring 376 pivotly bears against inner gimbal ring 321 so as to impart no moment to inner gimbal ring 321.

Although, the terms "front" and "back" are used to conform to the illustration, thrust bearing assembly 370 can be easily modified to operate in the reverse manner with pivot rod 371 in front of inner gimbal ring 321.

Returning to FIGS. 4 and 5 showing gimbaled angular displacement sensor assembly 300G, as best seen in FIG. 5, the movement about a first sensor axis 401 of inner gimbal ring 321 caused by angular displacement of cable 12 is sensed by first angular displacement sensor 400. The movement of inner gimbal ring 321 about a second sensor axis 421 caused by angular displacement of cable 12 is sensed by second angular displacement sensor 420. In the exemplary embodiment, first and second angular displacement sensors 400, 420 are optical encoders as are well known in the art.

First sensor 400 includes a moving portion 405, which rotates with inner gimbal ring 321, and a fixed portion 415 attached to pitch carriage 200. Moving portion 405 includes a radial arm 406 having an inner end 407 connected to sensor arm plate 321S of inner gimbal ring 321 and an outer end 408 having an encoder strip 409 thereon. Arm 406 rotates with inner gimbal ring 321 about first sensor axis 401. Fixed portion 415 includes an encoder read head 416 attached to pitch carriage 200 for reading encoder strip 409. Read head 416 outputs a signal, such as on line 308, indicative of rotation of inner gimbal ring 321 about first sensor axis 401.

Second sensor 420 includes a moving portion 425, which rotates with inner gimbal ring 321, and a fixed portion 435 attached to pitch carriage 200. Moving portion 425 includes a radial arm 426 having an inner end 427 connected to sensor arm plate 321S of inner gimbal ring 321 and an outer end 428 having an encoder strip 429 thereon. Arm 426 rotates with inner gimbal ring 321 about second sensor axis 421. Fixed portion 435 includes an encoder read head 436 attached to pitch carriage 200 for reading encoder strip 429. Read head 436 outputs a signal, such as on line 309, indicative of rotation of inner gimbal ring 321 about the second sensor axis 421.

In the exemplary embodiment, the first sensor axis 401 corresponds to turn axis $\theta$ and second sensor axis 421 corresponds to second axis $\phi$ such that the signal from first sensor 400 may directly be used to control turn servoed motor 122 to rotate turn carriage 100 toward cable alignment position 305 and the signal from second sensor 420 may directly be used to control pitch servoed motor 162 to rotate pitch carriage 200 toward the cable alignment position 305.

If the first and second sensor axes 401, 421 do not correspond to turn axis $\theta$ and second axis p, then the output signals from sensors 400, 420 are transposed by means well known in the art into corresponding turn axis $\theta$ and second axis $\phi$ rotations before being used to command servoed motors 122, 162 for rotation of turn and pitch carriages 100, 200 toward cable alignment position 305 wherein a measurement of a point may be taken.

As seen in FIG. 5, flexible anti-dust bag, such at flexible anti-dust bag 419, shown in cross-section, covering first displacement sensor 400, may be used to surround sensors to protect them from dust and dirt.

FIG. 9 is a perspective schematic of a second embodiment of the cable angular displacement sensor assembly 300 including proximity or contact sensors, such as contact sensors 380 mounted to frame 201. Incoming midsection 16 of cable 12 is shown in alignment position 305 wherein the local longitudinal axis 17 of cable 12 in confined incoming datum passage 339 is aligned with main datum passage 230.

A first pair 380A of contact sensors 381A, 381B, attached to frame 201, is equally spaced on opposite sides of cable 12 for detecting angular displacement of cable 12 about a first contact sensor axis perpendicular to a midline between first sensors 380A. A second pair 380B of contact sensors 381C, 381D, attached to frame 201, is equally spaced on opposite sides of cable 12 for detecting angular displacement of cable 12 about a second contact sensor axis perpendicular to a midline between second sensors 380B. If cable 12 is angularly displaced so as to touch sensor 381A, sensor 381A produces a signal on line 308C1 indicating rotation is required about the first contact sensor axis in a first direction. If cable 12 touches sensor 381B, sensor 381B produces a signal on line 308C2 indicating rotation is required about the first contact sensor axis in the opposite direction. If cable 12 is angularly displaced so as to touch sensor 381C, sensor 381C produces a signal on line 309C1 indicating rotation is required about the second contact sensor axis in a first direction. If cable 12 touches sensor 381D, sensor 381D produces a signal on line 309C2 indicating rotation is required about the second contact sensor axis in the opposite direction. Depending on the relationship between the first and second contact sensor axes with $\theta$ and $\phi$, the signals on lines 308C1, 308C2, 309C1 and 309C2 may directly control turn servoed motor 122 or pitch servoed motor 162 or may be transposed by means well known in the art into corresponding turn axis $\theta$ and second axis $\phi$ rotations before being used to command servoed motors 122, 162 for rotation of turn carriage 100 and pitch carriage 200 toward cable alignment position 305 wherein a measurement of a point may be taken.

Because the slight gaps between cable 12 and sensors 381A-381D introduce a slight error, contact sensors 380 are dithered about the sensor axes so that cable 12 is centered in the alignment position 305 before taking a measurement. Servoed motors 122, 162 are controlled to dither contact sensors 380.

FIG. 10 is a perspective schematic of a third embodiment of the cable angular displacement sensor assembly 300, including optical sensors 385 mounted to frame 201 for detecting movement of cable 12 from alignment position 305. Cable 12 is shown in alignment position 305 wherein the local longitudinal axis 17 of cable 12 in confined incoming datum passage 339 is aligned with main datum passage 230.

In the exemplary embodiment, each optical sensor 385 includes a light source 386, some focusing lenses 387, and a light sensor 388.

A pitch optical sensor 385A includes light source 386A that emits light and is disposed on one side of cable 12 and a light sensor 388A for receiving the emitted light is disposed on the other side of cable 12. Light sensor 388A may include a CCD array 389A or other light detector as is well known. One or more lenses, such as lenses 387, may be used to focus or magnify the light for accurate reading. Sensor 388A detects when the shadow of cable 12 moves up or down and produces a signal, such as on line 309D, indicative thereof for directing pitch servoed motor 162 to move pitch carriage 200 so as to return cable 12 to alignment position 305.

A turn optical sensor 385B includes light source 386B that emits light and is disposed on one side of cable 12 and light sensor 388B for receiving the light is disposed on the other side of cable 12. Light sensor 388B may include a CCD array 389B or other light detector as is well known. One or more lenses, such as lenses 387A, mounted to frame 201, may be used to focus or magnify the light for accurate reading. Sensor 388B detects when the shadow of cable 12 moves left or right and produces a signal, such as on line 308D, indicative thereof for directing turn servoed motor 122 to move turn carriage 100 so as to return cable 12 to alignment position 305.

In the exemplary embodiment, the output of optical sensors 385 corresponds directly to movement in θ and φ. However, other axes may be used and translated into movement in θ and φ.

Other types of optical sensors could be used, such as reflecting light off cable 12 to a light detector.

FIG. 11 is a perspective schematic of a fourth embodiment of the cable angular displacement sensor assembly 300 including a magnetic or electromagnetic sensor 390. A pitch electromagnetic sensor 390A detects the proximity of cable 12 and, when cable 12 moves up or down, produces a signal, such as on line 309E, indicative thereof for directing pitch servoed motor 162 to move pitch carriage 200 so as to return cable 12 to alignment position 305. A turn optical sensor 390B detects the proximity of cable 12 and, when 12 moves left or right, and produces a signal, such as on line 308E, indicative thereof for directing turn servoed motor 122 to move turn carriage 100 so as to return cable 12 to alignment position 305 wherein the local longitudinal axis 17 of cable 12 in confined incoming datum passage 339 is aligned with main datum passage 230.

Magnetic sensors could also be used to detect the proximity of cable. In the exemplary embodiment, the output of sensors 390 corresponds directly to movement in θ and φ. However, other axes may be used and translated into movement in θ and φ.

Figure 12:
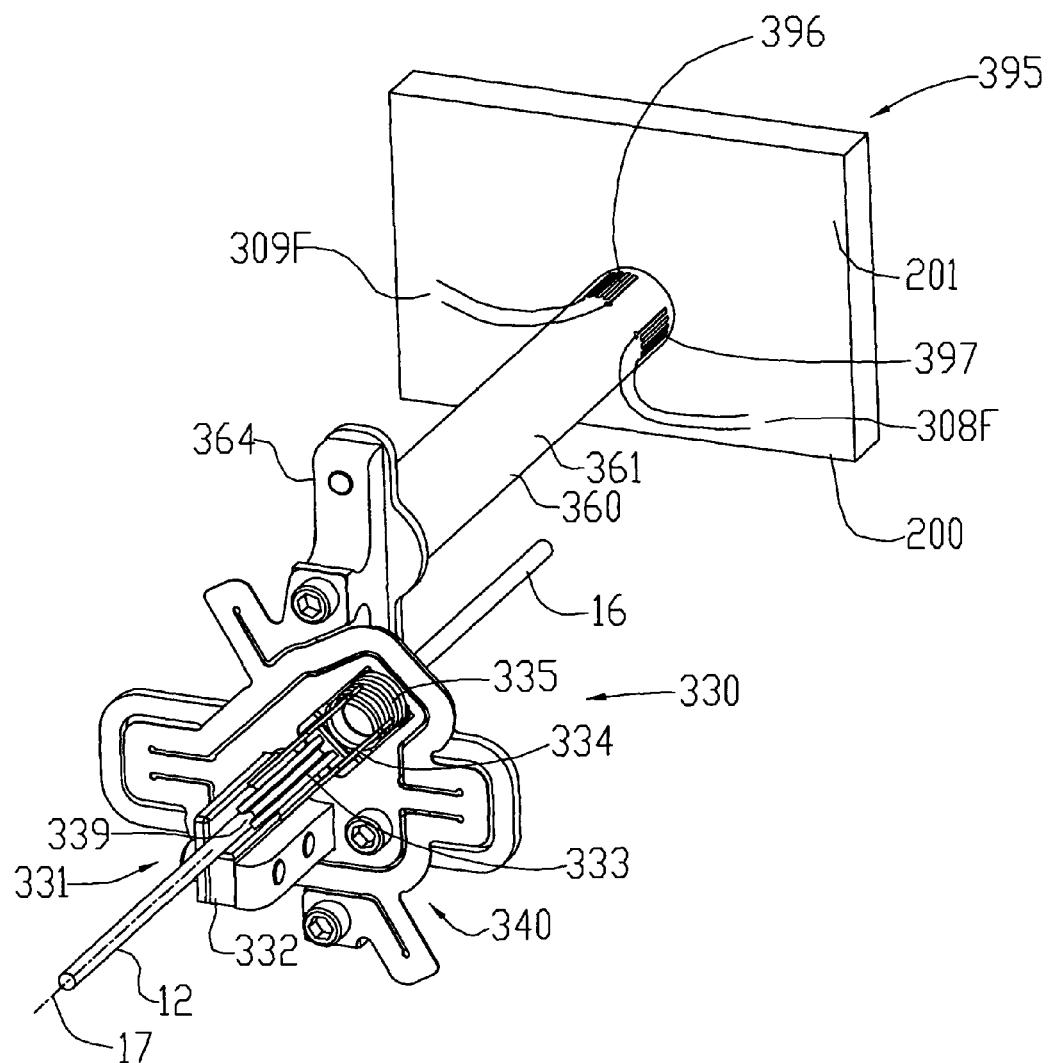
FIG. 12 is a perspective view of a fifth embodiment of the cable angular displacement sensor in the form of a moment sensor.

FIG. 12 is a perspective view of a fifth embodiment of the cable angular displacement sensor assembly 300 including a moment sensor 395. Tube 360 from the anti-moment gimbal from the confined cable passage 339 is solidly attached to frame 201. As discussed elsewhere, other means of producing a confined cable passage 339 such as in FIG. 12 are possible. For example confined passage 339 could be a tube with a close-fitting hole about the outer diameter of cable 12 that the cable 12 passes through, or could be opposing rollers that the cable passes between.

When cable 12 is moved up or down, or to the right or to the left though confined cable passage assembly 330, a side force is transmitted through confined cable passage 339, as a moment on arm 360, such as thin tube 361. Arm 360 produces detectable strain on load cells, such as strain gages 396 and 397 mounted on arm 360. Strain gages 396 and 397 produce strain signals which are processed in a manner well known in the art. Other types of load cells known in the art, such as other strain gage arrangements, piezo-resistive-element load cells, hydraulic load cells, pneumatic load cells and optical load cells, may be used. The strain induced on 360 in the vertical axis is detected by strain gage 396 and produces a signal, such as on line 309F, indicative thereof for directing turn servo motor 162 to move pitch carriage 200 so as to return cable 12 to alignment position 305. The strain induced on 360 in the horizontal axis is detected by strain gage 397 and produces a signal, such as on lines 308F, indicative thereof for directing turn servo motor 122 to move carriage 200 so as to return cable 12 to alignment position 305 wherein the local longitudinal axis 17 of cable 12 in confined incoming datum passage 339 is aligned with main datum passage 230.

Other arrangements of moment-load cell well known in the art may be applied to the mount end of thin tube 360 at the interface with 201.

Figure 14:
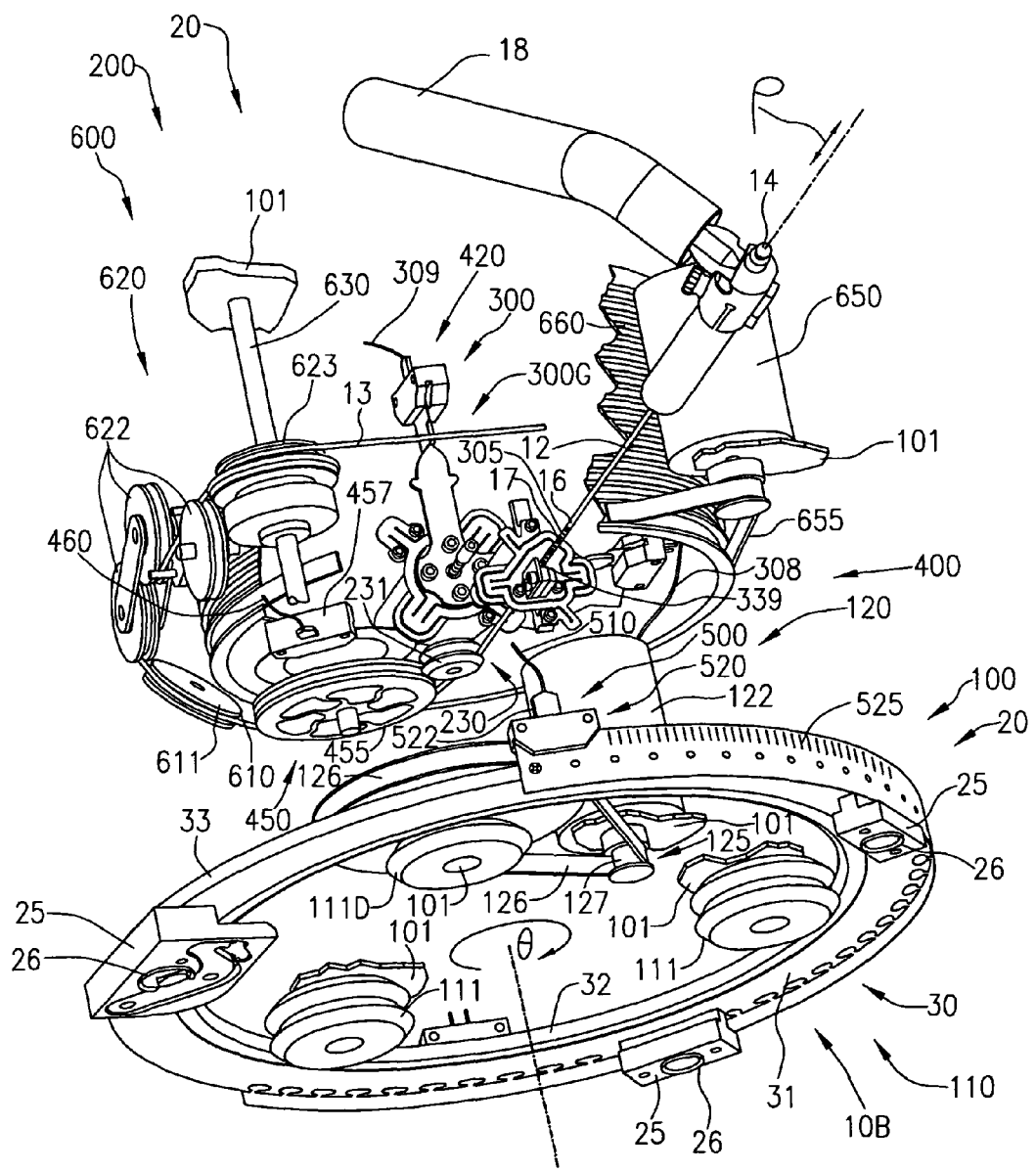
FIG. 14 is bottom, front, left side; partially cut away, perspective view similar to FIG. 3 of selective elements of an alternative embodiment of the measuring device including only one carriage.

FIG. 14 is a bottom, front, left side, partially cut away, perspective view of selective elements of a single carriage embodiment 10B of device 10 as was shown and described primarily with respect to FIGS. 2 and 3. Device 10B is similar to device 10 in most respects but differs as described below from device 10 in that there is only one carriage, such as turn carriage 200. Many elements that are mounted on pitch carriage 200 in device 10 are instead mounted on turn carriage 100 in device 10B. In the exemplary embodiment, device 10B includes a first displacement sensor, such as turn sensor 400, and a second angular displacement sensor, such as pitch sensor, 420. A simplified version of device 10B may omit pitch sensor 420. A light pointer, such as measuring laser pointer 270 producing laser beam 271, is attached to turn frame 201.

Device 10B can measure points in a plane that is close to ring 31 of base 30 and that is perpendicular to turn axis θ. Device 10B can measure these points with precision if the pitch axis sensor range is not exceeded or, otherwise, with sufficient accuracy for many applications. For example, device 10B can be used to measure flooring, such as tiles.

Main datum passage 230, cable supply means 600, cable length measuring means 450, and angular displacement sensor assembly 300 are attached to frame 101. Although a gimbaled angular displacement sensor 300G is shown, other angular displacement sensors, such as those shown and described herein, could be used.

Cable 12 is in alignment position 305 when the local longitudinal axis 17 of cable 12 at outer confined cable passage 339 is aligned with turn axis (θ). As cable free end 14 is moved from an old point to a new point that is not directly radially outward from the old point, cable midsection 16 is displaced angularly in angular displacement sensor assembly 300. Angular displacement sensor assembly 300 detects this angular displacement of cable 12 away from alignment position 305 and produces a signal or signals indicative thereof, such as on lines 308 and 309. Turn servoed motor assembly 120 rotates turn carriage 100 about turn axis θ responsive to the signals from angular displacement sensor assembly 300 indicative of cable displacement about turn axis (θ) so as to move angular displacement sensor assembly 300 to alignment position 305.

As discussed with respect to device 10; in device 10B, the location of the measured point is determined from turn-carriage measuring means 500, cable length measuring means 450, and pitch angle from the signals from angular displacement sensor assembly 300 indicative of pitch angle, such as on line 309.

Figure 15:
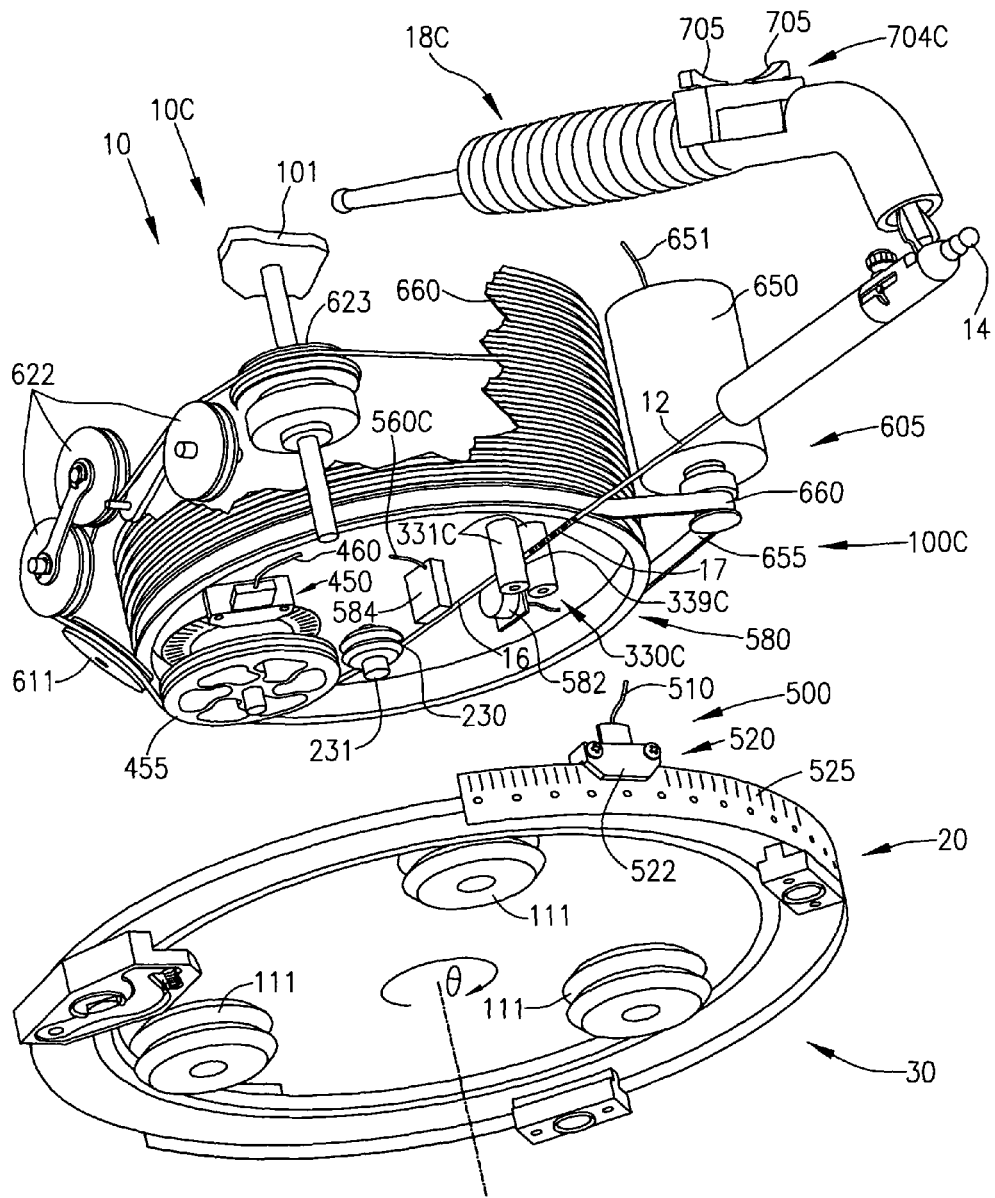
FIG. 15 is bottom, front, left side, partially cut away perspective view of an alternate embodiment of the device of FIG. 14.

FIG. 15 is bottom, front, left side, partially cut away perspective view of an alternate embodiment 10C of the device 10B of FIG. 14. Device 10C has a single carriage, that is first or turn carriage 100C, including a frame 101 rotationally mounted, such as by wheels 111, on base 30 of base unit 20 so as to rotate about turn axis θ (theta). Most of frame 101 is not shown in FIG. 15 for clarity, but can be seen in FIG. 3.

As previously described, main datum passage 230 is attached to turn carriage 100 for confined passage of midsection 16 of cable 12. In incoming cable passage assembly 330C is attached to turn carriage 100 and includes a pair of incoming cable passage members 331C defining a confined incoming cable passage 339C between main datum passage 230 and cable free end 14 providing passage of midsection 16 of cable 12 constrained tangentially to, i.e. orthogonal to radials of, turn axis θ. Cable 12 is in an alignment position when local longitudinal axis 17 of cable 17 in incoming datum passage 339C is radially aligned with main datum passage 230. Turn carriage 100 freely rotates about turn axis θ to the alignment position responsive to tangential force of cable 12 on members 331C of incoming cable passage 339C.

From main datum passage pulley 231, incoming cable 12 passes over a plurality of pulleys 455, 611, 622, 623 mounted to frame 101 before being fed onto cable storage reel 660 rotatably mounted on frame 101 as seen in FIG. 2. Cable tensioning means 605 attached to base unit 20, such as reel servo motor 650 attached to frame 101, adjusts the force required to move cable free end 14 away from base unit 20. In the exemplary embodiment, reel servoed motor 650 applies a tension to cable 12 by using belt 655 to rotate reel 660. The amount of electric current on line 651 to reel servoed motor 650 determines the torque of reel servoed motor 650 and, thus, the tension in cable 12.

In the exemplary embodiment, incoming cable passage assembly 330C includes cable angle measuring means, such as pitch measuring means 580, for measuring the angle or change of angle of cable 12 at incoming cable passage 339C in a plane parallel to turn axis θ and for producing a pitch signal, such as on line 560C, indicative thereof. In the exemplary embodiment, a light source 582 disposed on one side of cable 12 emits light, and a light sensor 584 for receiving the emitted light is disposed on the other side of cable 12. Light sensor 584 may include a CCD array or other light detector as is well known. One or more lenses, not shown, may be used to focus or magnify the light for accurate reading. Light sensor 584 detects when the shadow of cable 12 moves up or down and produces a signal, such as on signal line 560C, indicative thereof.

Although, optical pitch measuring means 580 is shown with reference to the single carriage positioning device 10C, alternate devices, such as those shown in FIGS. 4a, 10 and 11 and adapted for a single axis, could be used.

Figure 16:
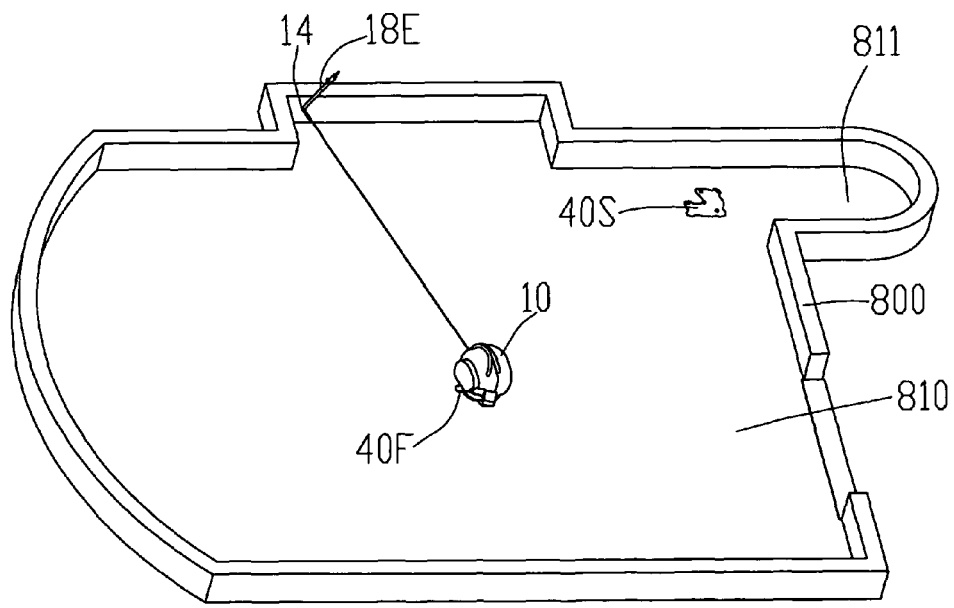
FIG. 16 is perspective diagram showing a device 10 measuring to create a design.

Each of the above-described devices 10A, 10B and 10C has an input mode wherein it may be used as an input/device and has an output mode wherein it can be used an output device as a cable positioning device. FIG. 16 is perspective diagram showing a device 10 measuring the floor 810 of room 800 to create a design 760 (FIG. 17) of floor 810, and FIG. 17 is a perspective view of device 10 positioning a mirror image of the acquired design 760 of floor 810 on the back of a workpiece 750, such as a sheet of carpet material 751 such that carpet can be cut to exactly fit floor 810.

In FIG. 16, base unit 20 is placed on first support 40F. The user places base unit 20 in input mode, places cable free end 14 along the edge of floor 810 and measures points as described with respect to FIG. 1 along the edge of floor 810 to define design 760 of outline of floor 810. An elongate extension grip 18E may be used to place cable end 14 along the floor outline so that the user does not need to bend down or crawl. If a portion of floor 810, such as alcove 811, is not in line of sight of device 10 on first support 40F, then device 10 is moved to second support 40S that is in line of sight of alcove 811 to measure alcove 811 as described with respect to FIG. 1. Measured design 760 of floor 810 is now in computer 700 and can be used and manipulated as any CAD design. For example, the measured design may be adjusted for shrinkage or stretching of material before being positioned on material 751.

Figure 17:
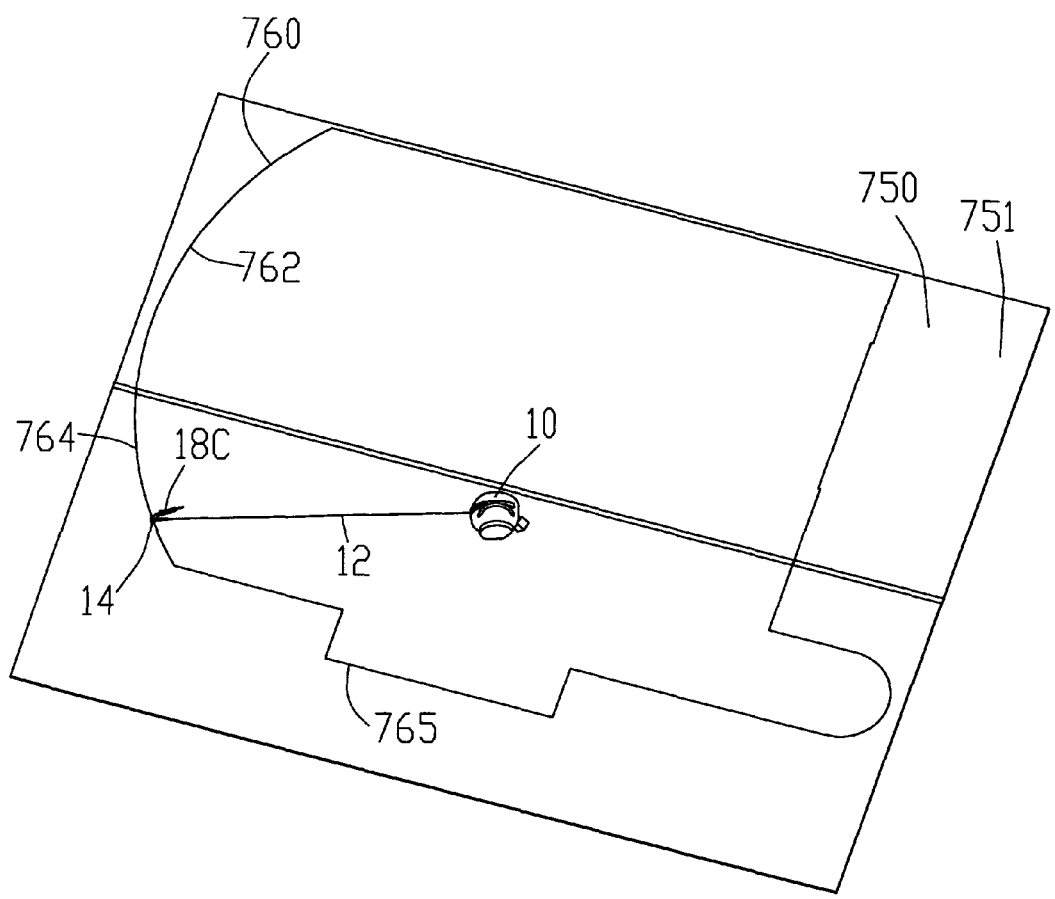
FIG. 17 is a perspective view of device 10 positioning an acquired design on a workpiece.

In FIG. 17, base unit 20 is placed in line of sight of workpiece 750 at any position and orientation relative to workpiece 750. The position and orientation can be established by using device 10 to measure known points on workpiece 750 or by using pre-established set positions for workpiece 750 and base unit 20.

Using device 10C of FIG. 15 as the positioning device, in the output mode with cable 12 in tension, computer 700 always knows the position of cable end 14 on workpiece 750 from the turn carriage signal and the cable length signal and either the pitch signal or the known height of base unit 20 relative to workpiece 750. User uses an input device, such as PDA to select a portion 762 of design 760 to position, such as by marking, on workpiece 750.

Figure 18:
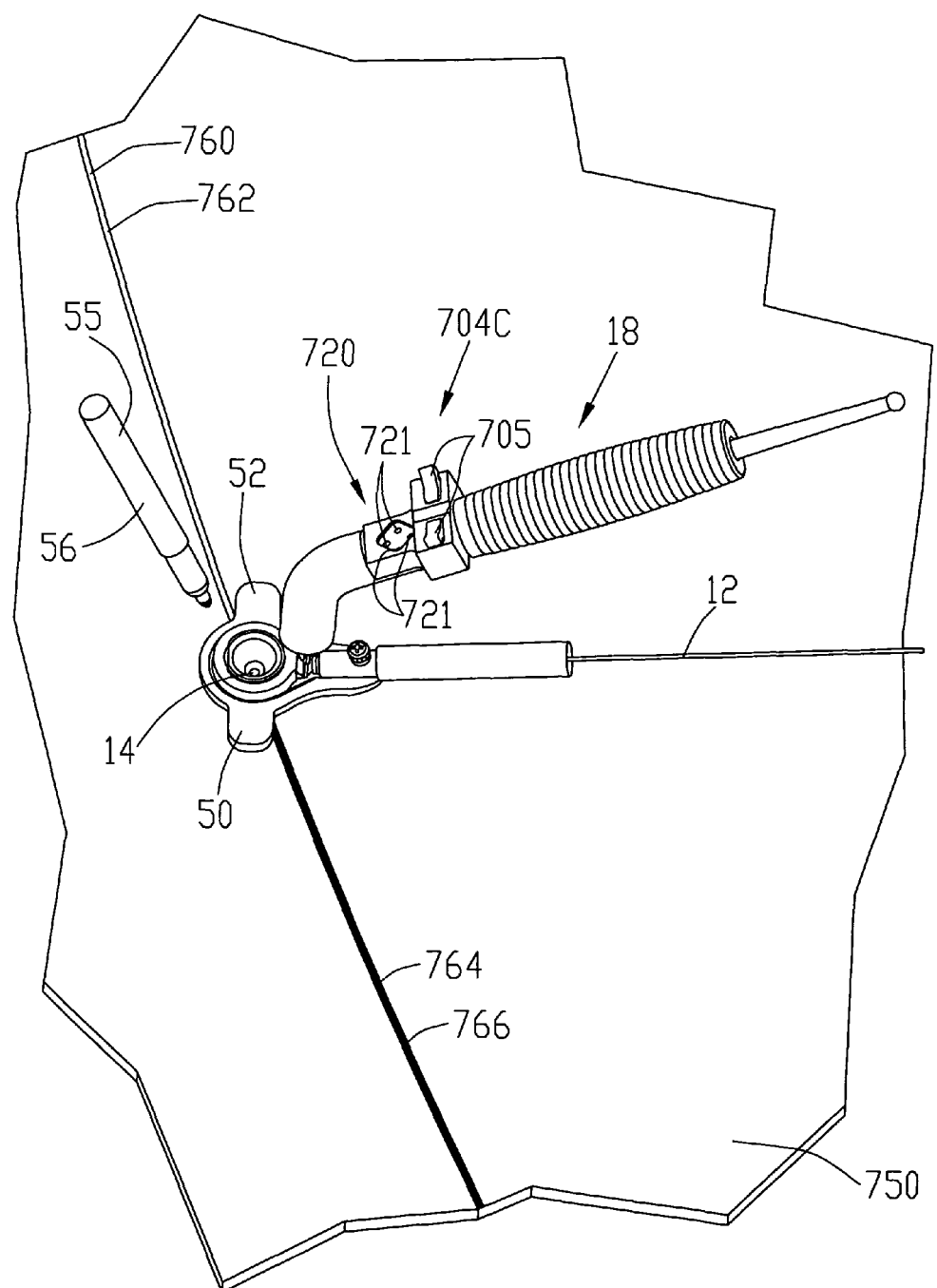
FIG. 18 is an enlarged perspective view of an alternate cable grip 18 incorporating a user interface and cable direction display.

The user is directed to move cable free end 14 orthogonally to cable 12 toward selected portion 762 of design 760 by cable direction means, such as audio signals or direction indication 720 on the display of the PDA 701 (FIG. 1) or on cable grip 18, as shown in FIG. 18. FIG. 18 is an enlarged perspective view of an alternate cable grip 18C incorporating a user interface 704C and cable direction indication 720 in communication with computer 700, such as by Bluetooth. Cable direction indication 720, such as LEDs 721, directs the user to move cable free end 14 to the right or to the left, or up or down or in and out. The selected portion 762 of the design may be a single point or may be a larger design element, such as arc 764 or line 765.

Turn carriage 100C freely pivots to the alignment position responsive to force of cable 12 on incoming datum passage 339C.

Computer 700 directs user to move radially in or out until free end 14 is at the distance to selected point. The preferred method of doing this is by changing the tension in cable 12 so as to be discernable to the user. Computer 700 directs reel servoed motor 650 to apply a first tension, such as half a pound, to cable 12 when free end 14 is located less than the distance to selected design portion 762 and a second tension, such as higher tension, such as two pounds, when cable free end 14 is at the selected distance and beyond. The user applies a tension between these two levels, such as one pound. If the cable is too long, the second tension from the motor will exceed the force of the user's hand and pull end 14 inward. If the cable is too short, the force from the user's hand will exceed the first tension and pull end 14 outward. Thus, motor 650 servos cable end 14 to a specific length corresponding to a point design 760.

Figure 19:
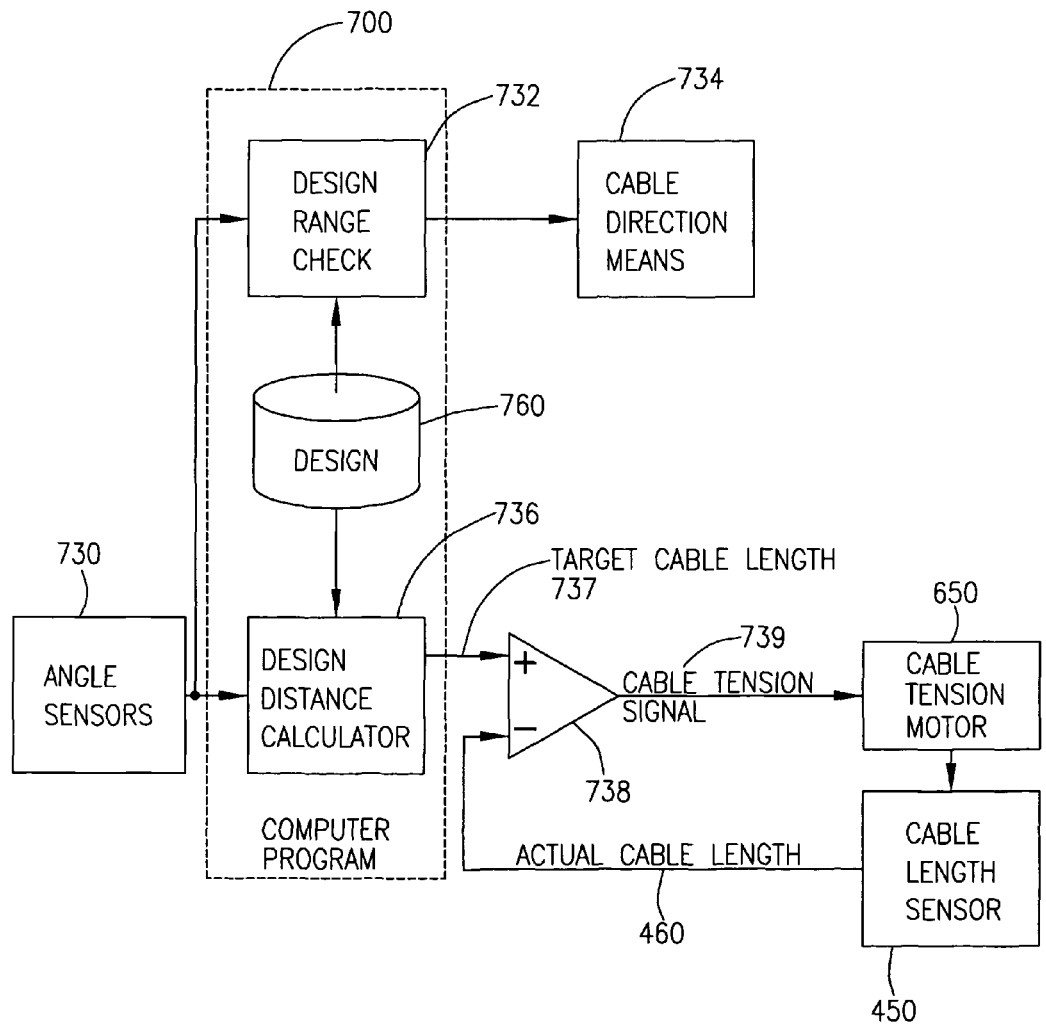
FIG. 19 is a diagram of a cable free end positioning function.

FIG. 19 is a schematic representation of this portion of the system's operation. The block marked Angle Sensors 730 represents any combination of sensors for determining the pitch and yaw of carriages 100, 200 and, hence, of cable 12, in two dimensions, such as pitch measuring means 580 and first carriage measuring means 500 of FIG. 15. A computer 700, such as PDA 701 of FIG. 1, receives signals from the angle sensors. Computer 700 also stores a design 760 and a selected portion 762 of the design 760 to be positioned. The portion of the computer's program marked Design Range Check 732 produces a signal for directing the user to move cable free end 14 into the range of angles encompassed by portion 762 of the design to be positioned. The block marked Cable Direction Means 734 represents any indication means used to communicate this direction signal to the user, such as LED's 721 of FIG. 18. The portion of the computer's program marked Design Distance Calculator 736 determines the length of cable necessary to place cable free end 14 on design 760 at the current angle. This sub-program produces a length signal 737. A comparator block 738 produces a cable tension signal 739 by comparing this target length signal with the cable's current length signal. Cable tension motor 650 responds to cable tension signal 739 by placing the corresponding tension on the cable. Finally, cable length sensor 450 determines the cable's current length signal 460 to complete the feedback loop.

When the indicators 704, 721 show cable free end 14 is at the design position, the position of cable free end 14 may be indicated, such as by marking, on workpiece 750. Returning to FIG. 18, a marking device 50 is attached to cable 12 for marking the end of cable 14 on planar surfaces. Marking device 50 includes a sliding surface 52 for sliding over workpiece 750 and marker 55 for marking workpiece 750 at end of cable 14. Marking device 50, as shown, includes a bore therethrough at end of cable 14 position for receiving a marker 55 in the form of a marking pen 56. Other markers 55 may be used as desired. For example, a spring-loaded center punch can be used to mark points for drilling in metal.

The user may use interface 704C, such as depressing button 705, to direct computer 700 to continuous position mode in which computer 700 continuously directs user to adjacent points on selected design 760. As seen in FIG. 18, in continuous position mode, the user maintains the tension at the low/high intersection and moves left or right as directed such that a continuous marked line 766 of design 760 can be drawn.

As seen in FIGS. 16 and 17, one device 10 may measure room 800 and the measured design may be sent electronically to a carpet seller where a second device 10 positions the design on the carpet where it can be cut and rolled for delivery to room 800.

Using device 10B of FIG. 14 as the positioning device in the output mode with design portion selected and cable 12 in tension; computer 700, responsive to the turn carriage measurement signal on line 510, is programmed to direct the cable direction means to direct the grip user to move cable free end 14 to the selected design portion 762 for marking. As cable 12 is moved by the user, turn carriage servoed motor 650 turns turn carriage 100 to track movement of cable 12 responsive to the turn signal from angular displacement sensor 300. Cable direction means may also indicate when cable free end 14 is at selected point 755A or within a predetermined distance therefrom. Computer 700 directs reel servoed motor 650 to adjust cable tension as described above.

In an alternate method of using device 10B of FIG. 14 as the positioning device in the output mode with design portion selected and cable 12 in tension; computer 700 is programmed to direct turn motor 122 to rotate turn carriage 100 to a target position wherein incoming cable passage 339 and main datum passage 230 are radially aligned with the selected portion 762 of design 760, to direct reel servoed motor to adjust cable tension as described above; and, responsive to the displacement signal from angular displacement sensor 400, to direct the cable direction means to direct the grip user to move cable free end 14 to the selected design portion 762 for marking.

Using device 10A of FIGS. 2 and 3 as the positioning device in the output mode with design portion selected and cable 12 in tension, computer 700 is programmed, responsive to the turn carriage measurement signal on line 510 and pitch carriage measurement signal on line 560, to direct the cable direction means to direct the grip user to move cable free end 14 to the selected design portion 762 for marking. As cable 12 is moved by the user, turn carriage servoed motor 650 turns turn carriage 100 and pitch carriage servoed motor 162 turns pitch carriage 200 to track movement of cable 12 responsive to the turn and pitch signals from angular displacement sensor 300. Cable direction means may also indicate when cable free end 14 is at selected point 755A or within a predetermined distance therefrom. Computer 700 directs reel servoed motor 650 to adjust cable tension as described above.

In an alternate method of using device 10A of FIGS. 2 and 3 as the positioning device in the output mode with design portion selected and cable 12 in tension, computer 700 is programmed to direct turn servoed motor 122 to rotate turn carriage 100 and pitch servoed motor 162 to rotate pitch carriage 200 to a target position wherein incoming cable passage 339 and main datum passage 230 are aligned with the selected portion 762 of design 760, to direct reel servoed motor to adjust cable tension as described above; and, responsive to the displacement signal from angular displacement sensor 400, to direct the cable direction means to direct the grip user to move cable free end 14 to the selected design portion 762 for marking.

Distances longer than the length of cable 12 may be measured by connecting a laser micrometer to the end of cable 12 and holding it, such as by grip 18, such that the emitted laser beam is parallel to cable 12 and the beam lands on the point being measured. The distance indicated by the laser micrometer is added to the cable distance to attain total distance.

Another method of measuring points at longer distances is to attach a distance measuring laser to base unit 20. User 90 may be positioned near the point to be measured and use means, such as a PDA with Bluetooth® to drive the turn and pitch servos to place the laser light on the point and take a measurement.

Device 10 can be used to measure artwork or blueprints and then scale up or scale down or even project the measured points on a surface, such as a wall.

Cable 12 preferably has a low and known strain. A wire cable of about one sixteenth inch diameter and having a breaking strength of about 300 pounds has been used. Temperature, humidity, and level sensors may be included to improve accuracy. Although cable 12 is shown and described as a traditional cable having a circular cross section, cable 12 could have a different cross section, such as rectangular tape or polygonal shape.

As and described above, device 10 can be used as both a cable measuring device and as a cable positioning device. Additionally, it can be used as a laser projection device. An ideal application using both input and output functions of device 10 is preparing a panel for attachment to a structure, shown.

Figure 22:
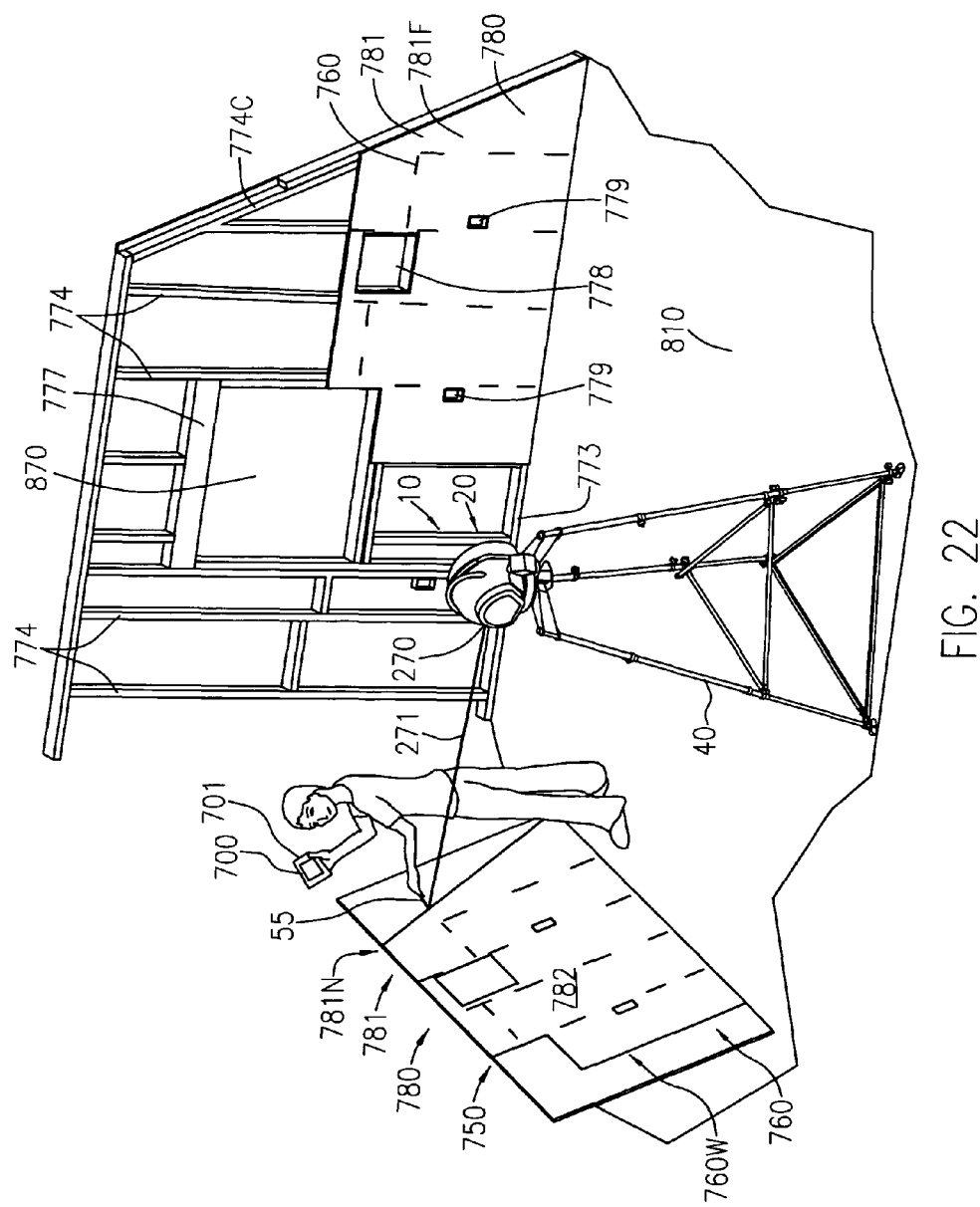
FIG. 22 is a perspective view of a user marking the design of the wall structure on a wallboard.

FIGS. 20-22 show using device 10 for preparing a panel 780 for fitting to a structure 770. FIG. 20 is a perspective view of grip user 90G using device 10 for measuring a structure 770, such as a frame 771, such as wall frame 772 to produce a digitized design. FIG. 21 is a perspective view showing cable measuring of an electrical outlet box 779 of structure 770. FIG. 22 is a perspective view of a user marking the projected digitized design 760W of the wall frame 772 on a workpiece 750, such as panel 780, such as wallboard 781. Wallboard 781 would typically be drywall, sometimes called sheetrock or gypsum board, but it could be paneling, such as of wood or other material, having a surface 782 for fitting to structure 770.

In FIG. 20, wall frame 772, shown, is intended to be a representative example and generally includes a sole plate 773 supported by floor 810, plurality of wall studs 774, including a slanted corner stud 774C, not all numbered, a plurality of cross-members joining studs 774, such as fire blockers 775, a cap plate 776 on top end of studs 774, and frame 777 for window 870, and framing 778 for receiving a switch box. Other members of structure 770 include electrical outlet boxes 779.

Device 10 is positioned on tripod 40 such that structure 770 is readily accessible for measuring by grip user 90G. The process of measuring an item to produce a digitized design has been previously discussed and highlights are reviewed here. For measuring with computer 700 in the input mode, grip user 900 holds grip 18 and places cable free end 14 on a point 755 to be measured, such as on the mid-line of a stud 774. Preferably, grip user 900 enters a sufficient number of selected points 755 into handheld computer 700, such as PDA 701, for computer 700 to produce a digitized design 760 defining structure 770. In the simplest mode, grip user 90G could enter all points to which grip user 90G may fit panel 780. This could be done by running cable free end 14 over all of the midlines of members of frame 771 and around the outline of potential cut-outs, such as around electrical boxes 779, switch box 778 and opening for window 870. Alternatively, however, PDA 701 is programmed in the manner of CAD such that grip user 900 may select that a linear member is being entered and then only needs to enter two or three points to define a stud for example, or indicate that an opening is being entered and then needs to only enter the corner points, for example. Lines upon which to cut may be measured or designated in the digitized design 760.

In FIG. 21 there is shown cable free end 14 measuring structure 770 including an electrical outlet box 779 as part of structure 770, Grip user 90G (not shown) grips grip 18 and guides cable free end 14 about the periphery and end face of outlet box 779 while inputting points for sufficiently defining outlet box 779.

In FIG. 22 device 10 is positioned such that laser pointer 270 can project a laser beam 271 on a piece of new wallboard 781N. The relative position of new wallboard 781N to device 10 must be known for computer 700 to properly direct laser pointer 270. The relative positions may be fixed such as by placing them in a fixture, or the relative positions may be determined by measuring a sufficient number of points of new wallboard 781N with computer 700 in a second input mode. The two carriages 100, 200 act as a gimbal. Thus, laser pointer 270 is mounted on a gimbal 100, 200 driven by computer controlled servoed motors 122, 162 for projecting the produced design 760W onto a panel 781N.

With computer 700 in output mode, on PDA 701 user 90 selects a portion or portions of wall frame design 760W for device 10 to project on new wallboard 781N with laser pointer 270. Projected design 760W is acted upon, such as by user 90 using a marker 55 to mark design 760W as it is projected. Via PDA, user 90 is told if currently projected portion is for a specific purpose, such as for fastening to or for being cut, and user 90 may mark that portion appropriately, such as with solid or dashed lines or with different color markers. In the example, cut lines are marked with solid lines and center lines for fasteners are marked with dashed lines.

Instead of projecting design 760W onto new wallboard 781N, cable 12 could be used to position design 760W as described previously, particularly with respect to FIGS. 16-19 where cable direction means, such as indicator 720, on grip 18 directs grip user 900 to move cable free end 14 toward the selected portion of design 760W on new wallboard 781N, and the cable tensioning motor 650 adjusts the force required to radially move cable free end 14 at the distance to a the point on design 760W in that direction.

New wallboard 781N is cut on cut lines to form a finished wallboard and is fitted on wall frame 772 as shown in FIG. 22. Fasteners, such as nails or screws can be driven through the appropriate design portions to attach finished wallboard 781F to wall frame 772.

Although not shown or described, structure 770 could include other features such as wires and pipes that could be included in design 760W, for example, to prevent later driving of fasteners into these items.

Although the invention has been shown and described with respect to wallboard and flat, planar panels, it is applicable to other panels, such as aircraft skin and ship plates.

From the foregoing description, it is seen that the present invention provides an extremely convenient, accurate and fast measuring and projecting or positioning device that can be operated by a single user.

In the following claims, the work "pitch" is used in a relative sense and not in an absolute, earth-reference sense.

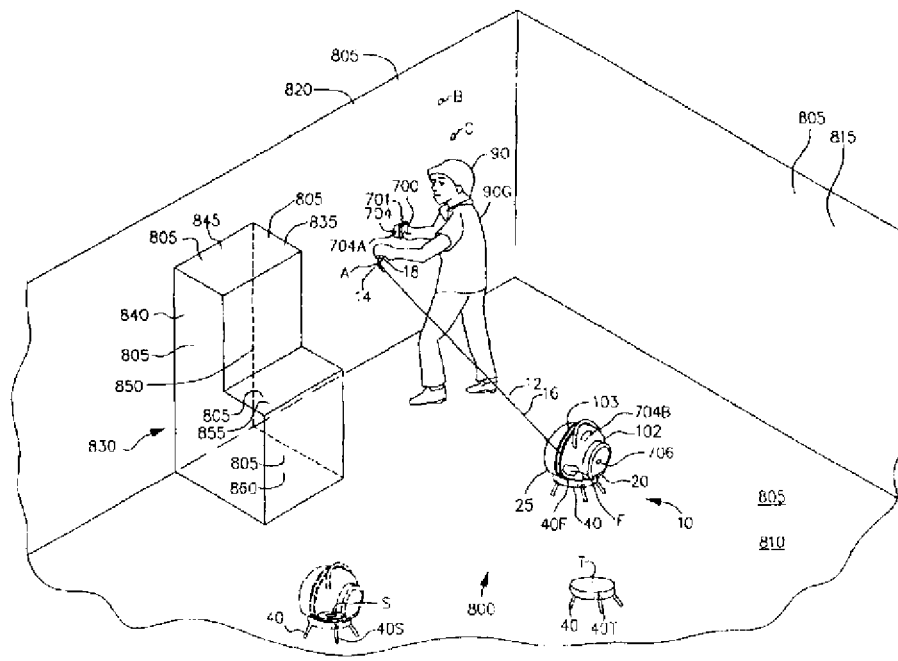

We claim:

1. A method of preparing a panel for fitting to a structure with a cable measuring and laser projection device comprising:
   a cable including:
      a supply end;
      a midsection; and
      a free end for placement on points of the structure;
   a base unit including:
      measuring means coupled to the cable for measuring direction and distance to each point and for producing measurement signals indicative thereof;
      a base;
      a first carriage rotationally attached to the base so as to be rotatable about a first axis;
      a second carriage rotationally attached to the first carriage so as to be rotatable about a second axis;
      a first motor coupled to the first carriage for rotating the first carriage about the first axis;
      a second motor coupled to the second carriage for rotating the second carriage about the second axis;
      first carriage measuring means on the base unit for measuring the rotational position or change of rotational position of the first carriage relative to the base and for producing a first carriage signal indicative thereof;
      second carriage measuring means attached to the base unit for measuring the rotational position or change of rotational position of the second carriage relative to the first carriage and for producing a second carriage signal indicative thereof; and
      a laser pointer mounted on the second carriage; and
   a computer including a program and memory; the computer including a first input mode for receiving the measurement signals and for producing a digitized design of the structure therefrom; the computer including an output mode for projecting portions of the produced design on the panel by the laser pointer by rotating the first carriage with the first motor responsive to the first carriage signal and rotating the second carriage with the second motor responsive to the second carriage signal; the method comprising the steps of:

producing a digitized design of the structure by placing the cable free end seriatim on a sufficient number of points of the structure to define the structure with the computer in the first input mode;

positioning the base unit and panel at known relative position; and switching the computer to output mode.

2. The method of claim 1 further including the step of:
marking on the surface the placed portions of the selected design.

3. The method of claim 1 wherein the computer includes a digitized design of the panel.

4. The method of claim 1 wherein the structure is a wall frame and the panel is a wall panel.

5. The method of claim 1 further including the step of:
selecting a portion of the produced design to be projected on the panel.

6. The method of claim 1 wherein the cable measuring and laser positioning device further includes a remote user input device in communication with the computer and further including the step of:
selecting with the remote user device a portion of the produced design to be projected on the panel.

7. The method of claim 6 further including the step of:
marking on the surface the placed portions of the selected design.

8. The method of claim 1 wherein the computer of the cable measuring device includes a second input mode for receiving the measurement signals and for determining the relative position of the panel therefrom; the method further including the step of:
determining the relative position of panel by placing the cable free end seriatim on a sufficient number of points of the panel with the computer in the second input mode.

9. A method of preparing a panel for fitting to a structure with a cable measuring and positioning device comprising:
a cable including:
 a supply end;
 a midsection; and
 a free end for placement on points of the structure and panel;
a base unit including:
 measuring means coupled to the cable for measuring direction and distance to each point and for producing measurement signals indicative thereof; and
 a cable tensioning motor attached to the base unit for adjusting the force required to move the cable free end away from the base unit;
cable direction means for directing a user to move the cable free end toward the portion of the design on the panel; and a computer including a program and memory; the computer including a first input mode for receiving the measurement signals and for producing a digitized design of the structure therefrom; the computer including an output mode for receiving measurement signals and, responsive thereto, for directing the cable direction means to direct the user to move the cable free end toward the position of a portion of the produced design on the panel and for directing the cable tensioning motor to adjust the tension in the cable sufficiently to indicate when cable free end is at a distance to the position of the portion of the produced design on the panel; the method comprising the steps of:

producing a digitized design of the structure by placing the cable free end seriatim on a sufficient number of points of the structure to define the structure with the computer in the first input mode;

positioning the base unit and panel at known relative position;

switching the computer to output mode;

responsive to the direction from the cable direction means, moving the cable free end toward a portion of the design; and moving the cable free end radially from the base unit to a distance of cable tension adjustment indicative that the free end is a distance corresponding to the portion of the design.

10. The method of claim 9 further including the step of:
marking on the surface the placed portions of the selected design.

11. The method of claim 9 wherein the computer includes a digitized design of the panel.

12. The method of claim 9 wherein the structure is a wall frame and the panel is a wall panel.

13. The method of claim 9 further including the step of:
selecting a portion of the produced design to be projected on the panel.

14. The method of claim 9 wherein the cable measuring and laser positioning device further includes a remote user input device in communication with the computer and further including the step of:
selecting with the remote user device a portion of the produced design to be projected on the panel.

15. The method of claim 9 wherein the computer of the cable measuring device includes a second input mode for receiving the measurement signals and for determining the relative position of the panel therefrom; the method further including the step of:
determining the relative position of panel by placing the cable free end seriatim on a sufficient number of points of the panel with the computer in the second input mode.

* * * * *

UNITED STATES PATENT AND TRADEMARK OFFICE
CERTIFICATE OF CORRECTION

PATENT NO. : 8,220,167 B2
APPLICATION NO. : 12/737486
DATED : July 17, 2012
INVENTOR(S) : David W. Swanson and William Robert Swanson Page 1 of 1

It is certified that error appears in the above-identified patent and that said Letters Patent is hereby corrected as shown below:

In the Claims

In Column 20, claim 1, line 45, after "axis;" insert --the second axis not being parallel to the first axis;--.

In Column 22, claim 14, line 39, delete "laser".

In Column 22, add new claim 16 as follows:

16. The method of claim 14 further including the step of:
   marking on the surface the placed portions of the selected design.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,220,167 B2 | Page 1 of 2 |
| APPLICATION NO. | : 12/737486 | |
| DATED | : July 17, 2012 | |
| INVENTOR(S) | : David W. Swanson and William Robert Swanson | |

It is certified that error appears in the above-identified patent and that said Letters Patent is hereby corrected as shown below:

Delete the title page and substitute therefore the attached title page showing the corrected number of claims in the patent.

In the Claims

In Column 20, claim 1, line 45, after "axis;" insert --the second axis not being parallel to the first axis;--.

In Column 22, claim 14, line 39, delete "laser".

In Column 22, line 52, add new claim 16 as follows:

16. The method of claim 14 further including the step of:
    marking on the surface the placed portions of the selected design.

This certificate supersedes the Certificate of Correction issued April 30, 2013.

Signed and Sealed this
Twenty-eighth Day of May, 2013

Teresa Stanek Rea
*Acting Director of the United States Patent and Trademark Office*

United States Patent
Swanson et al.

(10) Patent No.: US 8,220,167 B2
(45) Date of Patent: Jul. 17, 2012

(54) METHOD OF PREPARING A PANEL FOR FITTING TO A STRUCTURE

(75) Inventors: David W. Swanson, Fallbrook, CA (US); William Robert Swanson, Fallbrook, CA (US)

(73) Assignee: Delta II, I.P. (Trust), Stockton, CA (US)

( * ) Notice: Subject to any disclaimer, the term of this patent is extended or adjusted under 35 U.S.C. 154(b) by 25 days.

(21) Appl. No.: 12/737,486

(22) PCT Filed: Dec. 18, 2009

(86) PCT No.: PCT/US2009/006631
§ 371 (c)(1),
(2), (4) Date: Jan. 18, 2011

(87) PCT Pub. No.: WO2010/147575
PCT Pub. Date: Dec. 23, 2010

(65) Prior Publication Data
US 2011/0119936 A1 May 26, 2011

Related U.S. Application Data

(63) Continuation-in-part of application No. 12/214,585, filed on Jun. 20, 2008, and a continuation-in-part of application No. PCT/US2009/003690, filed on Jun. 18, 2009, and a continuation-in-part of application No. PCT/US2009/005368, filed on Sep. 29, 2009.

(51) Int. Cl.
*G01B 3/10* (2006.01)

(52) U.S. Cl. ........ 33/1 G; 33/700; 33/756; 33/DIG. 21; 702/152

(58) Field of Classification Search ............... 33/1 G, 33/700, 701, 756, 760, 762, DIG. 21
See application file for complete search history.

(56) References Cited

U.S. PATENT DOCUMENTS

| | | | | |
|---|---|---|---|---|
| 4,249,314 A * | 2/1981 | Beck | | 33/1 PT |
| 4,316,081 A * | 2/1982 | Washizuka et al. | | 33/762 |
| 5,286,972 A * | 2/1994 | Falk et al. | | 33/756 |
| 6,006,978 A | 12/1999 | Swanson | | |
| 6,785,973 B1 | 9/2004 | Janssen | | |
| 7,055,261 B2 * | 6/2006 | Nain | | 33/760 |
| 7,395,609 B2 | 7/2008 | Powell | | |
| 7,665,223 B2 * | 2/2010 | Swanson et al | | 33/756 |
| 2007/0033823 A1 * | 2/2007 | Steinich | | 33/756 |
| 2008/0072443 A1 * | 3/2008 | Powell | | 33/503 |

* cited by examiner

*Primary Examiner* — G. Bradley Bennett
(74) *Attorney, Agent, or Firm* — Palomar Patent; Calif Tervo

(57) ABSTRACT

The method uses a cable measurement and cable positioning or laser projection device to measure a structure to produce a digitized design of the structure and to put the design on a panel by laser pointer projection or by cable positioning so that the panel can be marked and cut for fitting on the structure.

16 Claims, 19 Drawing Sheets